United States Patent
Ma et al.

(10) Patent No.: US 10,216,013 B2
(45) Date of Patent: *Feb. 26, 2019

(54) VANADIUM DIOXIDE-BASED OPTICAL AND RADIOFREQUENCY SWITCHES

(71) Applicant: Wisconsin Alumni Research Foundation, Madison, WI (US)

(72) Inventors: Zhenqiang Ma, Middleton, WI (US); Chang-Beom Eom, Madison, WI (US); Jaeseong Lee, San Jose, CA (US); Daesu Lee, Madison, WI (US); Sang June Cho, Fitchburg, WI (US); Dong Liu, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/451,745

(22) Filed: Mar. 7, 2017

(65) Prior Publication Data
US 2018/0259796 A1    Sep. 13, 2018

(51) Int. Cl.
*G02F 1/01* (2006.01)
*G02F 1/00* (2006.01)
*G02F 1/313* (2006.01)
*H01P 3/00* (2006.01)

(52) U.S. Cl.
CPC .......... *G02F 1/0054* (2013.01); *G02F 1/0147* (2013.01); *G02F 1/313* (2013.01); *H01P 3/003* (2013.01); *G02F 2202/105* (2013.01)

(58) Field of Classification Search
CPC ..................................................... G02F 1/0054
See application file for complete search history.

(56) References Cited

U.S. PATENT DOCUMENTS

| | | | |
|---|---|---|---|
| 3,547,594 A | 12/1970 | Teeg | |
| 6,653,704 B1 | 11/2003 | Gurney | |
| 7,583,176 B1 * | 9/2009 | Robinson | H01C 7/047 |
| | | | 257/108 |
| 7,642,881 B1 | 1/2010 | Robinson et al. | |
| 8,864,957 B2 | 10/2014 | Ramanathan | |
| 8,871,363 B2 | 10/2014 | Tsuchiya | |
| 9,627,490 B1 * | 4/2017 | Eom | H01L 29/24 |
| 2008/0032441 A1 | 2/2008 | Hirai | |
| 2009/0213636 A1 | 8/2009 | Koinuma et al. | |
| 2010/0314617 A1 | 12/2010 | Ito | |
| 2011/0151639 A1 | 6/2011 | Lim et al. | |
| 2011/0175047 A1 | 7/2011 | Ramanathan et al. | |

(Continued)

OTHER PUBLICATIONS

Subramanyam, Guru & Shin, Eunsung & Brown, D & Yue, Hailing. (2013). Thermally controlled vanadium dioxide thin film microwave devices. Midwest Symposium on Circuits and Systems. 73-76. 10.1109/MWSCAS.2013.6674588.*

(Continued)

*Primary Examiner* — Omar R Rojas
(74) *Attorney, Agent, or Firm* — Bell & Manning, LLC

(57) ABSTRACT

Switches for electromagnetic radiation, including radiofrequency switches and optical switches, are provided. Also provided are methods of using the switches. The switches incorporate layers of high quality $VO_2$ that are composed of a plurality of connected crystalline $VO_2$ domains having the same crystal structure and orientation.

16 Claims, 23 Drawing Sheets

(56) References Cited

U.S. PATENT DOCUMENTS

| | | |
|---|---|---|
| 2011/0181345 A1 | 7/2011 | Ramanathan |
| 2012/0286743 A1 | 11/2012 | Soltani et al. |
| 2014/0266391 A1 | 9/2014 | Parkin et al. |
| 2015/0340607 A1 | 11/2015 | Ramanathan |

OTHER PUBLICATIONS

Yajima et al., Drastic change in electronic domain structures via strong elastic coupling in $VO_2$ films, Physical B 91, May 6, 2015, pp. 205102-1-205102-6.

Moore et al., A Surface-Tailored, Purely Electronic, Mott Metal-to-Insulator Transition, Science 318, Oct. 26, 2007, pp. 615-619.

F. J. Morin, Oxides which show a metal-to-insulator transition at the Neel temperature. Phys. Rev. Lett., vol. 3, No. 1, Jul. 1, 1959, pp. 34-36.

Morrison et al., A photoinduced metal-like phase of monoclinic $VO_2$ revealed by ultrafast electron diffraction, Science 346, Oct. 24, 2014, pp. 445-448.

Wegkamp et al., Instantaneous band gap collapse in photoexcited monoclinic $VO_2$ due to photocarrier doping, Phys. Rev. Lett. 113, Nov. 17, 2014, pp. 216401-1-216401-5.

Arcangeletti et al., Evidence of a pressure-induced metallization process in monoclinic $VO_2$. Phys. Rev. Lett. 98, May 10, 2007, pp. 196406-1-196406-4.

Tao et al., Decoupling of structural and electronic phase transitions in $VO_2$, Phys. Rev. Lett. 109, Oct. 18, 2012, pp. 166406-1-166406-5.

Ko et al., Work function of vanadium dioxide thin films across the metal-insulator transition and the role of surface nonstoichiometry, ACS Appl. Mater. Interfaces 3, Aug. 9, 2011, pp. 3396-3401.

Griffiths et al., Influence of stoichiometry on the metal-semiconductor transition in vanadium dioxide, J. Appl. Phys. 45, 1974, pp. 2201-2206.

A. Atrei et al., Composition and structure of ultrathin vanadium oxide layers deposited on SnO2(110), Surface Science 513, 2002, pp. 149-162.

Hyun Koo et al., Effect of Oxide Buffer Layer on the Thermochromic Properties of VO2 Thin Films, Journal of Materials Engineering and Performance, vol. 22 (12), Oct. 1, 2013, pp. 3967-3972.

R. Molaei et al., A microstructural approach toward the effect of thickness on semiconductor-to-metal transition characteristics of VO2 epilayers, Journal of Applied Physics 115, 164311, Apr. 29, 2014, pp. 1-8.

Zongtao Zhang et al., Solution-based fabrication of vanadium dioxide on F:SnO2 substrates with largely enhanced thermochromism and low-emissivity for energy-saving applications, Energy & Environmental Science, DOI: 10.1039/c1ee02092g, Sep. 8, 2011, pp. 1-8.

Matthias Batzill et al., The surface and materials science of tin oxide, Progress in Surface Science 79, 2005, pp. 47-154.

O.M. Osmolovskaya et al., Synthesis of Vanadium Dioxide Thin Films and Nanopowders: A Brief Review, Rev. Adv. Mater. Sci. 36, 2014, pp. 70-74.

Tsung-Han Yang et al., On growth of epitaxial vanadium oxide thin film on sapphire (0001), Journal of Materials Research, vol. 25, Issue 03, Mar. 2010, pp. 422-426.

Feliks Chudnovskiy et al., Switching device based on first-order metal insulator transition induced by external electric field, Future Trends in Microelectronics: the Nano Millennium, 2002, pp. 148-155.

Gisia Beydaghyan et al., High contrast thermochromic switching in vanadium dioxide (VO2) thin films deposited on indium tin oxide substrates, Thin Solid Films 522, Jul. 28, 2012, pp. 204-207.

A. Atrei et al., XPD Study of Vanadium Oxide Films Grown on the SnO2(110) Surface, Surface Review and Letters, vol. 6, No. 6, 1999, pp. 1187-1193.

You Zhou et al., Voltage-triggered Ultra-fast Metal-insulator Transition in Vanadium Dioxide Switches, IEEE Electron Device Letters, 34, 202, 2013, pp. 1-7.

Yaoming Sun et al., Anisotropic vanadium dioxide sculptured thin films with superior thermochromic properties, Scientific Reports 3:2756, Sep. 25, 2013, pp. 1-10.

Mikhail Esaulkov et al., Emission of terahertz pulses from vanadium dioxide films undergoing metal-insulator phase transition, Optica vol. 2, No. 9, Sep. 4, 2015, pp. 790-796.

Zheng Yang et al., Oxide Electronics Utilizing Ultrafast Metal-Insulator Transitions, Annu. Rev. Mater. Res. 41, Mar. 30, 2011, pp. 337-367.

Bellantoni et al., Monolithic GaAs p-i-n Diode Switch Circuits for High-Power Millimeter-Wave Applications, IEEE Transactions on Microwave Theory and Techniques, vol. 37, No. 12, Dec. 1989, pp. 2162-2165.

Lampen et al., A Wafer-Capped, High-Lifetime Ohmic MEMS RF Switch, International Journal of RF and Microwave Computer-Aided Engineering, vol. 14, No. 4, Jun. 9, 2004, pp. 338-344.

Goldsmith et al., Performance of Low-Loss RF MEMS Capacitive Switches, IEEE Microwave and Guided Wave Letters, vol. 8, No. 8, Aug. 1998, pp. 269-271.

Saias et al., An Above IC MEMS RF Switch, IEEE Journal of Solid-State Circuits, vol. 38, No. 12, Dec. 2003, pp. 2318-2324.

Barker, Jr. et al., Infrared Optical Properties of Vanadium Dioxide Above and Below the Transition Temperature, Physical Review Letters, vol. 17, No. 26, Dec. 26, 1966, pp. 1286-1289.

Maurer et al., Investigation of transition metal oxides by ultrasonic microscopy, Materials Science and Engineering: A, vol. 370, Issues 1-2, Apr. 15, 2004, pp. 440-443.

Aetukuri et al., Control of the metal-insulator transition in vanadium dioxide by modifying orbital occupancy, Nature Physics, vol. 9, Sep. 22, 2013, pp. 661-666.

Briggs et al., Compact silicon photonic waveguide modulator based on the vanadium dioxide metal-insulator phase transition, Optics Express, vol. 18, No. 11, May 12, 2010, pp. 11192-11201.

Zhang et al., Wafer-scale growth of VO2 thin films using a combinatorial approach, Nature Communications 6:8475, Oct. 9, 2015, pp. 1-8.

Aurelian et al., Exploiting the Semiconductor-Metal Phase Transition of VO2 Materials: a Novel Direction towards Tuneable Devices and Systems for RF-Microwave Applications, Advanced Microwave and Millimeter Wave Technologies Semiconductor Devices Circuits and Systems, Moumita Mukherjee (Ed.), ISBN: 978-953-307-031-5, InTech, Mar. 1, 2010, pp. 35-56.

Ha et al., Electrical switching dynamics and broadband microwave characteristics of VO2 RF devices, J. Appl. Phys. 113, 184501, DOI: 10.1063/1.4803688, May 8, 2013.

Dumas-Bouchiat et al., rf-microwave switches based on reversible semiconductor-metal transition of VO2 thin films synthesized by pulsed-laser deposition, Applied Physics Letters 91, 223505, Nov. 27, 2007, pp. 1-3.

Madan et al., 26.5 Terahertz Electrically Triggered RF Switch on Epitaxial VO2-on-Sapphire (VOS) Wafer, 2015 IEEE International Electron Devices Meeting, Dec. 7, 2015.

Driscoll et al., Current oscillations in vanadium dioxide: Evidence for electrically triggered percolation avalanches, Physical Review B 86, 094203, Sep. 17, 2012, pp. 1-8.

Driscoll et al., Memristive adaptive filters, Applied Physics Letters 97, 093502, Sep. 1, 2010, pp. 1-3.

Driscoll et al., Phase-transition driven memristive system, Applied Physics Letters 95, 043503, Jul. 27, 2009, pp. 1-3.

Driscoll et al., Memory Metamaterials, Science, vol. 325, Sep. 18, 2009, pp. 1518-1521.

Driscoll et al., Dynamic tuning of an infrared hybrid-metamaterial resonance using vanadium dioxide, Applied Physics Letters 93, 024101, Jul. 14, 2008, pp. 1-3.

Qazilbash et al., Correlated metallic state of vanadium dioxide, Physical Review B 74, 205118, Nov. 22, 2006, pp. 1-5.

Qazilbash et al., Electrodynamics of the vanadium oxides VO2 and V2O3, Physical Review B 77, 115121, Mar. 17, 2008, pp. 1-10.

(56) References Cited

OTHER PUBLICATIONS

Qazilbash et al., Infrared spectroscopy and nano-imaging of the insulator-to-metal transition in vanadium dioxide, Physical Review B 79, 075107, Feb. 10, 2009, pp. 1-10.
Qazilbash et al., Mott Transition in VO2 Revealed by Infrared Spectroscopy and Nano-Imaging, Science, vol. 318, Dec. 14, 2007, pp. 1750-1753.
Qazilbash et al., Nanoscale imaging of the electronic and structural transitions in vanadium dioxide, Physical Review B 83, 165108, Apr. 13, 2011, pp. 1-7.
Berezina et al., Metal-Semiconductor Transition in Nonstoichiometric Vanadium Dioxide Films, Inorganic Materials, vol. 43, No. 5, 2007, pp. 505-511.
Boriskov et al., The Effect of Electric Field on Metal-Insulator Phase Transition in Vanadium Dioxide, Technical Physics Letters, vol. 28, No. 5, 2002, pp. 406-408.
Chudnovskii et al., Electroforming and Switching in Oxides of Transition Metals: The Role of Metal—Insulator Transition in the Switching Mechanism, Journal of Solid State Chemistry 122, Article No. 0087, 1996, pp. 95-99.
Pergament et al., Oxide Electronics and Vanadium Dioxide Perspective: A Review, Journal on Selected Topics in Nano Electronics and Computing, vol. 1, No. 1, Dec. 2013, pp. 24-43.
Pergament et al., Phase composition of anodic oxide films on transition metals: a thermodynamic approach, Thin Solid Films 322, 1998, pp. 33-36.
Stefanovich et al., Anodic oxidation of vanadium and properties of vanadium oxide films, J. Phys.: Condens. Matter 16 , May 28, 2004, pp. 4013-4024.
Stefanovich et al., Electrical switching and Mott transition in VO2, J. Phys.: Condens. Matter 12, 2000, pp. 8837-8845.
Weiss et al., Ultrafast Silicon-Based Modulators Using Optical Switching of Vanadium O2, Final Report, Apr. 12, 2014, pp. 1-20.
Ryckman et al., Photothermal optical modulation of ultra-compact hybrid Si-VO2 ring resonators, Optics Express, vol. 20, No. 12, May 29, 2012, pp. 13215-13225.
Joushaghani et al., Wavelength-size hybrid Si-VO2 waveguide electroabsorption optical switches and photodetectors, Optics Express, vol. 23, No. 3, Feb. 5, 2015, pp. 3657-3668.
Kats et al., Vanadium Dioxide as a Natural Disordered Metamaterial: Perfect Thermal Emission and Large Broadband Negative Differential Thermal Emittance, Physical Review X 3, 041004, Oct. 21, 2013, pp. 1-7.
Kim et al., Nanoscale imaging and control of resistance switching in VO2 at room temperature, Applied Physics Letters 96, 213106, May 25, 2010, pp. 1-3.
Ko et al., Stability of electrical switching properties in vanadium dioxide thin films under multiple thermal cycles across the phase transition boundary, Journal of Applied Physics 104, 086105, Oct. 30, 2008, pp. 1-3.
Ruzmetov et al., Infrared reflectance and photoemission spectroscopy studies across the phase transition boundary in thin film vanadium dioxide, J. Phys.: Condens. Matter 20, 465204 , Oct. 21, 2008, pp. 1-5.
Ruzmetov et al., Hall carrier density and magnetoresistance measurements in thin-film vanadium dioxide across the metal-insulator transition, Physical Review B 79, 153107, Apr. 20, 2009, pp. 1-4.
Ruzmetov et al., Structure-functional property relationships in rf-sputtered vanadium dioxide thin films, Journal of Applied Physics 102, 113715, Dec. 11, 2007, pp. 1-7.
Seo et al., Voltage-Pulse-Induced Switching Dynamics in VO2 Thin-Film Devices on Silicon, IEEE Electron Device Letters, vol. 32, No. 11, Nov. 2011, pp. 1582-1584.
Yang et al., Studies on electric triggering of the metal-insulator transition in VO2 thin films between 77 K and 300 K, Journal of Applied Physics 110, 033725, Aug. 15, 2011, pp. 1-5.
Yang et al., Dielectric and carrier transport properties of vanadium dioxide thin films across the phase transition utilizing gated capacitor devices, Physical Review B 82, 205101, Nov. 1, 2010, pp. 1-8.
Yang et al., Studies on room-temperature electric-field effect in ionic-liquid gated VO2 three-terminal devices, Journal of Applied Physics 111, 014506, Jan. 6, 2012, pp. 1-5.
Zhou et al., Voltage-Triggered Ultrafast Phase Transition in Vanadium Dioxide Switches, IEEE Electron Device Letters, vol. 34, No. 2, Jan. 4, 2013, pp. 220-222.
International Search Report and Written Opinion mailed in PCT/US2018/019397, dated May 17, 2018.

\* cited by examiner

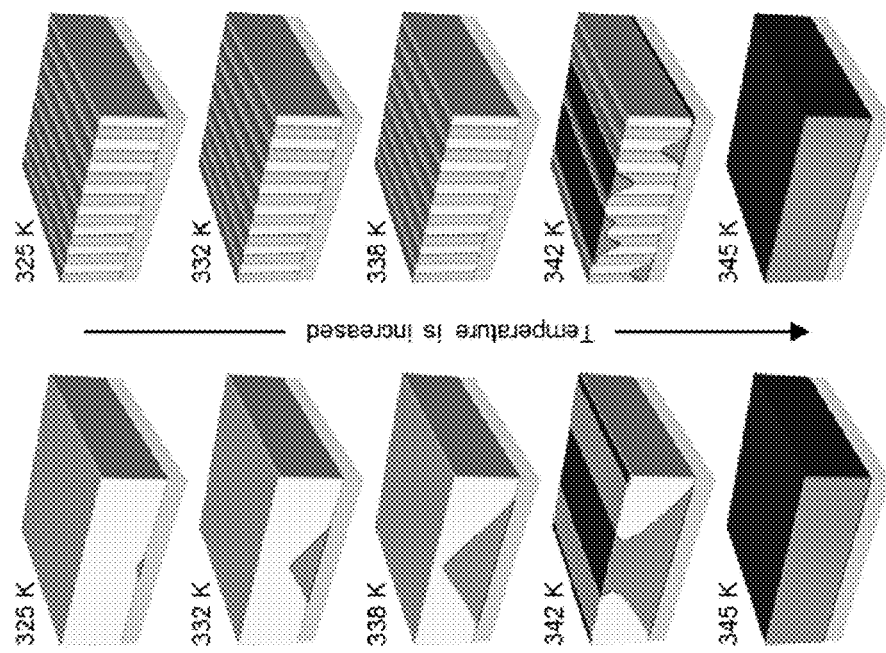
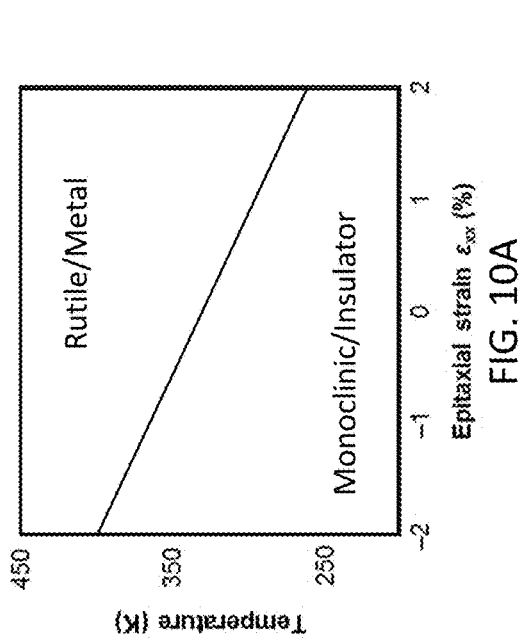
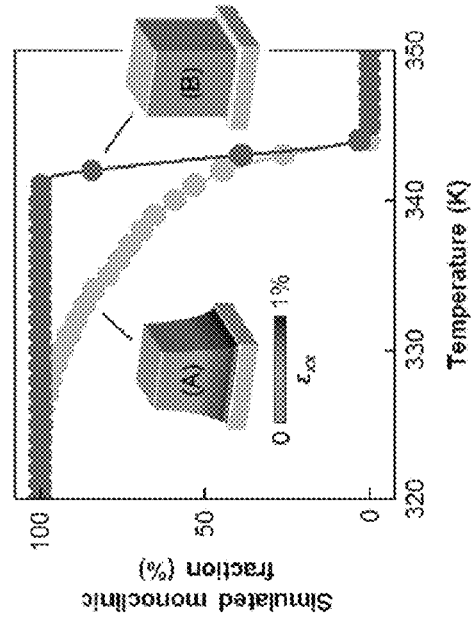
FIG. 10A
FIG. 10B
FIG. 10C

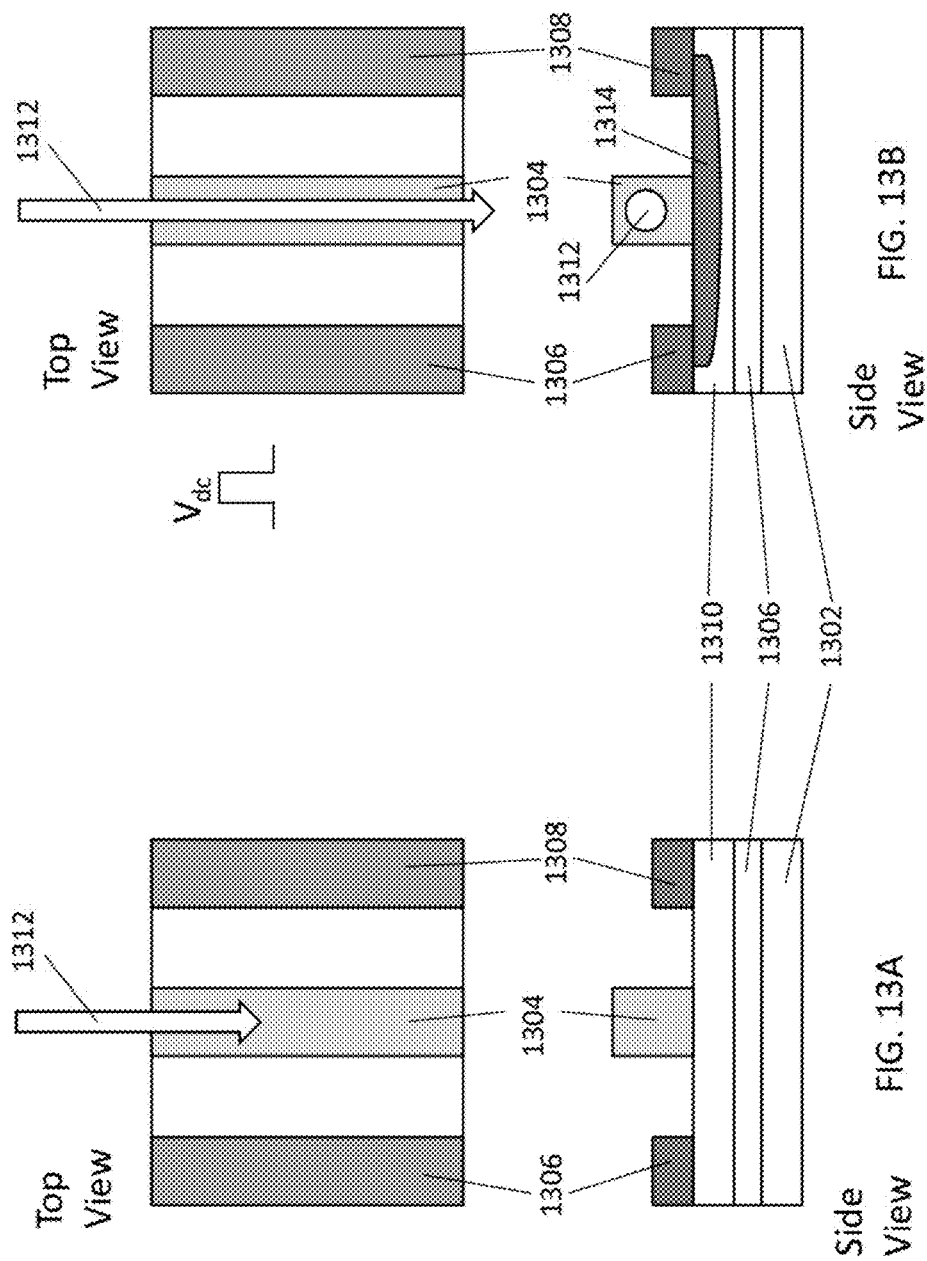

VANADIUM DIOXIDE-BASED OPTICAL AND RADIOFREQUENCY SWITCHES

REFERENCE TO GOVERNMENT RIGHTS

This invention was made with government support under N00014-13-1-0183 awarded by the Office of Naval Research. The government has certain rights in the invention.

BACKGROUND

Correlated oxide materials have been studied as candidates for electronic and optical application devices such as switches, sensors, and modulators due to substantial changes in their material properties such as conductivity and optical constants by phase transition. Compared to other correlated oxide materials that have a lower or a much higher phase transition temperature than room temperature, vanadium dioxide ($VO_2$) exhibits a sharp insulator-to-metal transition (IMT) from the monoclinic insulating phase to the tetragonal metallic phase at 68° C. The relatively low phase transition temperature enables one to utilize the transition characteristic for electrical switching devices. However, the imperfect crystal quality of $VO_2$ films has limited the development of high-performance $VO_2$-based devices. Single crystalline bulk $VO_2$ or epitaxial $VO_2$ thin films have suffered from fracture and degradation of their physical properties due to a large elastic stress during phase transition. Moreover, the misfit strain in epitaxial films results in unreliable IMT characteristics or causes IMT to occur below room temperature. Due to such difficulties in $VO_2$ growth, polycrystalline or amorphous $VO_2$ thin films have been used for most application devices.

SUMMARY

Switches for electromagnetic radiation, including radiofrequency switches and optical switches, are provided. Also provided are methods of using the switches.

One embodiment of a switch for electromagnetic radiation includes: an electromagnetic radiation waveguide; a layer of $VO_2$ in electrical or optical communication with the electromagnetic radiation waveguide; and an external stimulus source configured to apply an insulator to metal phase transition-inducing external stimulus to the layer $VO_2$. The layer of $VO_2$ in the switch comprises a plurality of connected crystalline $VO_2$ domains having the same crystal structure and epitaxial orientation.

The switches include radiofrequency switches and optical switches. The switches include both shunt and series switches. In an embodiment of a shunt switch, the $VO_2$ is in electrical communication with a ground line, as well as the electromagnetic radiation waveguide, such that the electromagnetic signal is shorted to ground when the $VO_2$ is in its metallic state. An electromagnetic signal can be switched using the shunt switch by transmitting a signal along the waveguide when the $VO_2$ is in an insulating state; and applying an external stimulus from the external stimulus source to the $VO_2$, wherein the external stimulus induces the $VO_2$ to undergo an insulator to metal phase transition, thereby attenuating the transmission of the signal along the waveguide.

In an embodiment of a series switch, the electromagnetic radiation waveguide is a discontinuous waveguide comprising a first portion and a second portion, wherein the first portion is connected to the second portion through the layer of $VO_2$. An electromagnetic signal can be switched using the series switch by transmitting a signal along the first portion of the waveguide when the $VO_2$ is in an insulating state; and applying an external stimulus from the external stimulus source to the $VO_2$, wherein the external stimulus induces the $VO_2$ to undergo an insulator to metal phase transition, thereby increasing the transmission of the signal transmitted from the first portion of the waveguide to the second portion of the waveguide.

In an embodiment of an optical switch, the electromagnetic radiation waveguide is an optical waveguide and the layer of $VO_2$ is in optical communication with the optical waveguide. An optical signal can be switched using the series switch by transmitting an optical signal along the optical waveguide when the $VO_2$ is in its insulating state; and applying an external stimulus from the external stimulus source to the $VO_2$, wherein the external stimulus induces the $VO_2$ to undergo an insulator to metal phase transition, thereby increasing the transmission of the optical signal along the optical waveguide.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 7A shows the I-V characteristics of a $VO_2$ switch connected in series with resistors of values ranging from 1.5 to 6 kΩ FIG. 7B shows the $VO_2$ resistance as a function of series resistance extracted from the slopes of I-V curves in FIG. 7A.

FIGS. 10A through 10C show a theoretical prediction of the phase transition and its dynamics in epitaxial $VO_2$ as follows. FIG. 10A is a calculated strain-temperature phase diagram of a (001) $VO_2$ film. Epitaxial strain is defined as the relative change of in-plane lattice constant, i.e., $(a_{film}-a_{bulk})/a_{bulk}$. Insets indicate atomic structures of monoclinic and rutile $VO_2$. FIG. 10B shows a simulated fraction of the monoclinic phase on heating in epitaxial $VO_2$ films with strain gradient [denoted by (A), corresponding to thick $VO_2$ films on (001) $TiO_2$] and with uniform bulk-like lattice [denoted by (B)]. FIG. 10C shows phase-field simulations of phase transition dynamics on heating for (A) and (B) cases in FIG. 10B. There are two different monoclinic domains and the rutile phase.

FIG. 11A is a schematic diagrams showing the expected profile of lattice strain in epitaxial $VO_2$ films on (001) $TiO_2$ without a $SnO_2$ template. FIG. 11B is a schematic diagrams showing the expected profile of lattice strain in epitaxial $VO_2$ films on (001) $TiO_2$ with a $SnO_2$ template. Images in the right display the V atomic positions, obtained by LAADF (low angle annular dark field) imaging mode of scanning transmission electron microscopy (STEM), near the bottom interface. FIG. 11C shows the X-ray RSM results around the $TiO_2$ (112) Bragg peak for 300-nm-thick $VO_2$ films on (001) $TiO_2$ without a $SnO_2$ template. FIG. 11D shows the X-ray RSM results around the $TiO_2$ (112) Bragg peak for 300-nm-thick $VO_2$ films on (001) $TiO_2$ with a $SnO_2$ template. The closed circle and the closed star indicate the peak position for the $VO_2$ film and bulk, respectively. FIG. 11E shows bright field TEM images for 300-nm-thick $VO_2$ films on (001) $TiO_2$ without a $SnO_2$ template. FIG. 11E shows bright field TEM images for 300-nm-thick $VO_2$ films on (001) $TiO_2$ with a $SnO_2$ template. White arrows in FIG. 11E and dashed lines in FIG. 11F indicate cracks and domain/grain boundaries, respectively. FIGS. 11G and 11H are spatial maps for the out-of-plane lattice strain $\varepsilon_{by}$, i.e., $(c_{film}-c_{bulk})/c_{bulk}$, in $VO_2$ films for the areas in FIGS. 11E and 11F.

FIG. 12A shows in-situ TEM images during the monoclinic-to-rutile SPT on heating 300-nm-thick $VO_2$ films on (001) $TiO_2$ without a $SnO_2$ template. FIG. 12B shows in-situ TEM images during the monoclinic-to-rutile SPT on heating 300-nm-thick $VO_2$ films on (001) $TiO_2$ with a $SnO_2$ template. The temperature was ramped up at 5 K min$^{-1}$ during these measurements. FIG. 12C shows the monoclinic area as a function of temperature, estimated from the in-situ TEM images in FIGS. 12A and 12B. FIG. 12D shows the electrical resistivity as a function of temperature for the $VO_2$ films.

FIGS. 13A through 13F show an electrically switchable optical modulator using epitaxial $VO_2$ as follows. FIG. 13A is a schematic drawing for the optical modulator composed of a single-crystal Si waveguide and epitaxial $VO_2$ film without applying an external voltage $V_{dc}$. FIG. 13B is a schematic drawing for the optical modulator consisting of a single-crystal Si waveguide and epitaxial $VO_2$ film with an applied external voltage $V_{dc}$. The $VO_2$ region can be metallized by applying $V_{dc}$, which is higher than the threshold voltage for IMT. FIG. 13C shows simulated light propagation through the Si waveguide for a light wavelength λ of 1.55 μm, when the $VO_2$ is in the insulating state. FIG. 13D shows simulated light propagation through the Si waveguide for the light wavelength λ of 1.55 μm, when the $VO_2$ is in the metallic state. Fundamental TE-mode continuous-wave transmission through the Si waveguide was simulated by the finite-difference time-domain method, and electric-field intensity was captured. FIG. 13E shows the measured optical transmission as a function of time t for λ=1.55 μm, when $V_{dc}$=15 V is switched on and off for $VO_2/TiO_2$-devices.

FIG. 13F shows measured optical transmission as a function of time t for λ=1.55 μm, when $V_{dc}$=15 V is switched on and off for $VO_2/SnO_2/TiO_2$-based devices. The magnitude of transmission is also expressed in shading from light (low transmission) to dark (high transmission). Black solid lines are the fitted results with the formula of 1−exp(−t/τ) and exp(−t/τ).

DETAILED DESCRIPTION

Switches for electromagnetic radiation, including radiofrequency switches and optical switches, are provided. Also provided are methods of using the switches. The switches incorporate layers of high quality $VO_2$ that are composed of a plurality of connected crystalline $VO_2$ domains having the same crystal structure and epitaxial orientation. In the $VO_2$ layer, the domains are "connected" to one another by domain boundaries. In contrast, in a cracked single crystal of $VO_2$, small crystallites are "disconnected" due to the cracks. The $VO_2$ has a sharp insulator to metal phase transition (IMT) at temperatures moderately higher than room temperature. The IMT is accompanied by a large decrease in resistively, which makes the $VO_2$ useful in radiofrequency switching applications. The IMT also decreases the refractive index of the $VO_2$ and increases its extinction coefficient, which makes the $VO_2$ useful in optical switching applications.

The $VO_2$ layer can be grown epitaxially on a symmetrically isostructural $SnO_2$ template. The lattice mismatch between the $VO_2$ and $SnO_2$ produces small, well-connected domains of $VO_2$ having the same crystal structure in the epitaxial film and confines severe structural defects (e.g., strain gradients and cracks) to the area near the $SnO_2/VO_2$ interface. This leads to homogeneous, bulk-like lattices in the $VO_2$ film, without compromising the film's epitaxial nature. This structural homogeneity also enables homogeneous electronic and chemical states throughout the films, which is highly desirable for creating reliable, high performance devices, such as high-speed switches.

The VO$_2$ in the epitaxial films is characterized by an IMT critical temperature. Below this critical temperature, the VO$_2$ has an electrically insulating monoclinic crystal structure. As the VO$_2$ is heated to and above its critical temperature, the crystal structure transitions to a metallic conducting rutile crystal structure. In the VO$_2$ films, the transition is very sharp and is accompanied by a large decrease in the films' electrical resistance. In addition, the small crystalline domains in the VO$_2$ films help them to absorb the stresses and strains that accompany the phase transition, enabling the films to undergo many phase transition cycles without cracking. As a result, the VO$_2$ films are well suited for switching applications.

Figure 1:
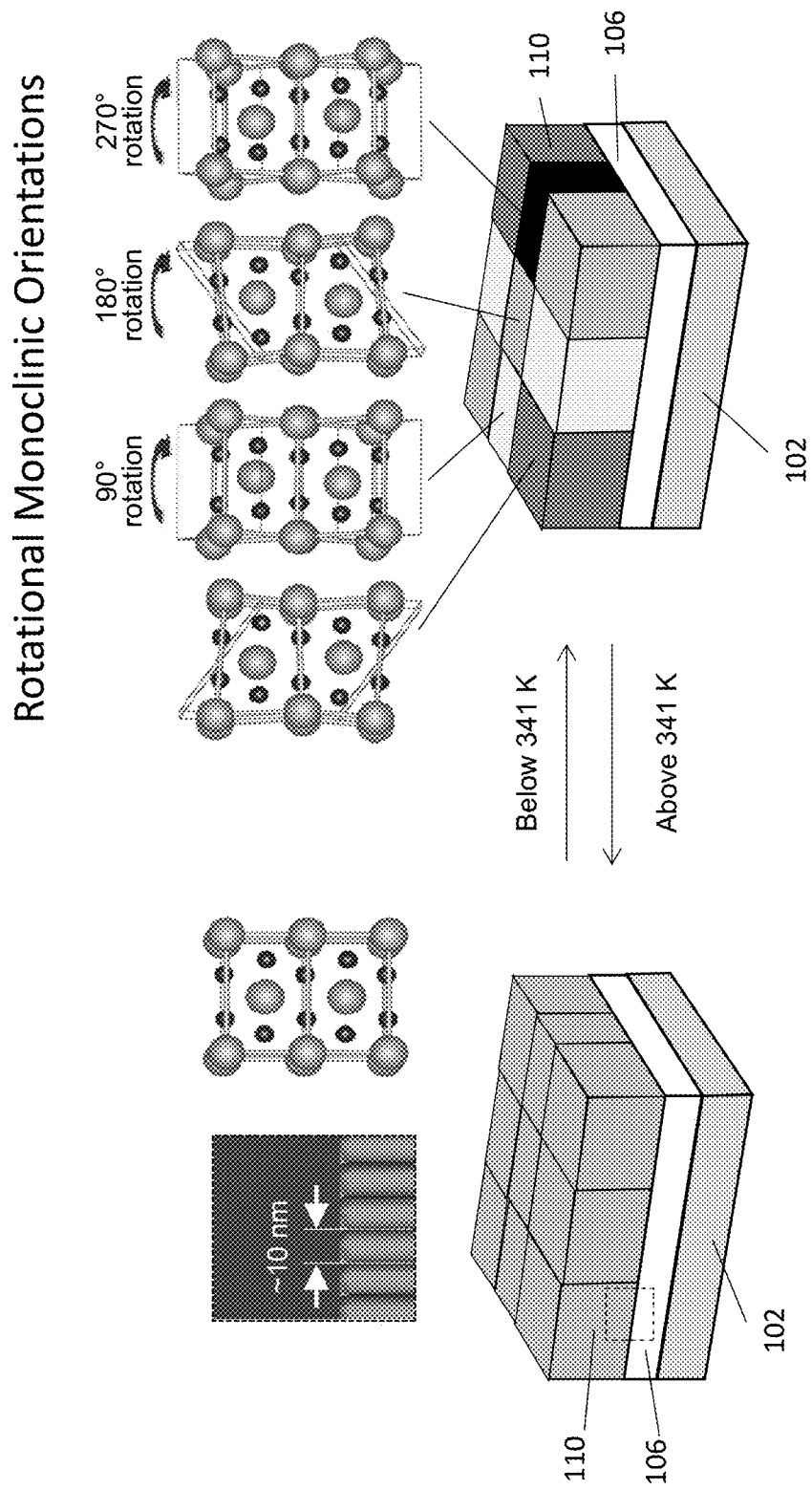
FIG. 1. Schematic diagram showing a multilayered structure comprising a $VO_2$ overlayer below its critical phase transition temperature (right) and above its critical phase transition temperature (left). The rutile (left) and monoclinic (right) crystal structures of the $VO_2$ are shows above the multilayered structures.

One embodiment of a layered structure comprising a VO$_2$ overlayer is shown schematically in FIG. 1. The right side the figure shows the structure at a first temperature that is below the IMT critical temperature (T$_{crit}$) and the left side of the figure shows the structure at a second temperature that is above the T$_{crit}$. The structure comprises a single-crystalline, rutile TiO$_2$ substrate 102 having an exposed TiO$_2$ (001) growth surface. A template layer 106 comprising columnar crystalline domains of rutile SnO$_2$ is disposed on TiO$_2$ substrate 102. An enlarged portion of the interface between the VO$_2$ layer and the SnO$_2$ layer (dashed square), showing the columnar nature of the SnO$_2$, is provided in the inset. The columnar, crystalline domains of rutile SnO$_2$ are grown epitaxially and, therefore, have an epitaxially relationship with the underlying TiO$_2$. Rutile SnO$_2$ domains have an exposed (001) surface on which an overlayer 110 comprising a plurality of connected crystalline VO$_2$ domains of is disposed. Epitaxial growth of the SnO$_2$ and VO$_2$ can be accomplished using, for example, pulsed laser deposition (PLD) as illustrated in the Examples.

The lattice mismatch between the TiO$_2$ substrate and the SnO$_2$ results in the epitaxial, nanoscale, crystalline columnar domains in the SnO$_2$ growing upward from the TiO$_2$ growth surface. These domains, which have the same crystal structure (rutile) and orientation, nucleate separately on the growth surface and grow together to form a growth template that is isostructural with the subsequently grown VO$_2$ at growth temperatures above T$_{crit}$. As such, the SnO$_2$ films and the VO$_2$ grown on the SnO$_2$ films, are not polycrystalline films in which a plurality of crystal domains are oriented randomly within the film. As used herein, the term nanoscale columnar domains refers to columnar domains having average cross-sectional diameters that are no greater than 200 nm. This includes columnar domains having average cross-sectional diameters that are no greater than 100 nm; no greater than 50 nm; and no greater than 20 nm. For example, in some embodiments of the SnO$_2$ films, the columnar domains have average cross-sectional diameters in the range from about 5 nm to about 10 nm. The thickness of the SnO$_2$ layer is typically in the range from about 100 nm to about 300 nm, but thicknesses outside of this range can be used.

The lattice mismatch between the SnO$_2$ and the VO$_2$ limits the size of the epitaxially grown VO$_2$ domains and concentrates and/or confines any cracks in the VO$_2$ film to a small volume near the SnO$_2$/VO$_2$ interface, while the remainder of the VO$_2$ may be crack- and strain-free. This is advantageous because it allows the VO$_2$ layers to be grown to commercially practical thicknesses without any significant cracking beyond the lowermost portion of the layer. By way of illustration only, in some embodiments of the layered structures, the VO$_2$ layer has a thickness of at least 100 nm. This includes layered structures having a VO$_2$ layer thicknesses of at least 200 nm and further includes layered structures having a VO$_2$ layer thicknesses of at least 300 nm.

For example, in some embodiments, the VO$_2$ layer thickness is in the range from about 100 nm to about 500 nm. This includes embodiments in which the VO$_2$ layer thickness is in the range from about 200 nm to about 400 nm. In each of these embodiments, the cracks and/or strains (if present at all) may be confined to within a few nanometers (for example, 10 nm or fewer, including 5 nm or fewer) of the SnO$_2$/VO$_2$ interface.

The small size of the VO$_2$ domains helps the VO$_2$ film to absorb the stresses and strains of the IMT, which reduces cracking during phase change cycling and improves and sustains device performance. As used here, the size of the domains refers to the largest cross-sectional width of the domains, where the width dimension is perpendicular to the thickness dimension. In some embodiments of the layered structures, the average width of the VO$_2$ domains is no greater than about 500 nm. This includes embodiments in which the average width of the VO$_2$ domains is no greater than about 400 nm and further includes embodiments in which the average width of the VO$_2$ domains is no greater than about 300 nm. The VO$_2$ domains are well-connected, have a common crystal structure and an epitaxial relationship with the underlying SnO$_2$. At temperatures below T$_{crit}$, the VO$_2$ has a monoclinic crystal structure and is electrically insulating. The monoclinic VO$_2$ domains can have four different rotational domains that are rotated by 90° from each other in the plane of the film. The different rotational domains are represented by area of different shading in overlayer 110 on the right side of FIG. 1. The four different rotational domain variants of the monoclinic VO$_2$ are shown in the upper right side of FIG. 1. At temperatures above T$_{crit}$, the VO$_2$ has a tetragonal rutile crystal structure and acts as an electrical conductor. The rutile crystal structure is shown in the upper left side of FIG. 1.

The T$_{crit}$ for the VO$_2$ in the overlayer is greater than room temperature (i.e., greater than 27° C.) and is similar to, or the same as, the T$_{crit}$ for bulk VO$_2$. Typically, the T$_{crit}$ is greater than 55° C. and in the range from about 58° C. to about 68° C. (e.g., 60° C. to 66° C.). (Unless otherwise indicated, the phase transition critical temperatures referred to in this disclosure refer to the critical temperature in the absence of an applied external field or strain.)

The high quality VO$_2$ films grown on SnO$_2$ template layers can be characterized by their sharp IMTs, where the sharpness of a transition is characterized by the full width at half maximum (FWHM) of the derivative curve of a heating curve, as illustrated in the Examples. Some embodiments of the VO$_2$ films have a phase transition sharpness of 5° C. or less. This includes VO$_2$ films having a phase transition sharpness of 3° C. or less and further includes VO$_2$ films having a phase transition sharpness of 1° C. or less. These sharp transition can be achieved even in films with thicknesses above 100 nm, above 200 nm, and above 300 nm.

The monoclinic to rutile (insulating to conducting) phase transition is accompanied by a large drop in the vanadium dioxide's magnitude of electrical resistance (ΔR), which can be measured as described in the Examples. Some embodiments of the VO$_2$ films have a ΔR of at least 2 orders of magnitude. This includes VO$_2$ films having a ΔR of at least 3 orders of magnitude and further includes VO$_2$ films having a ΔR of at least 4 orders of magnitude.

Although the switches can retain the SnO$_2$ template layer and TiO$_2$ substrate upon which the VO$_2$ layer is grown, it is also possible to remove one or both of these layers after VO$_2$ layer growth and before it is incorporated into a switch. The released VO$_2$ layer can be transferred onto another support substrate, which may be an electrically conducting (metallic), semiconducting, or electrically insulating substrate.

One embodiment of a switch for electromagnetic radiation signals includes an electromagnetic radiation waveguide in electrical and/or optical communication with a layer of the $VO_2$. The two components can be considered to be electrical communication with one another if a current can flow from one to the other when the $VO_2$ is in its insulating state, its metallic states, or when it is in either state. Two components that are in electrical communication can be in direct contact, but they need not be. The two components can be considered to be optical communication with one another if an optical signal can pass from one to the other when the $VO_2$ is in its insulating state, its metallic states, or when it is in either state. Two components that are in optical communication can be in direct contact, but they need not be.

The waveguide provides a signal line for the transmission electromagnetic radiation. Therefore, the waveguide material will depend on the nature of the radiation to be transmitted. By way of illustration, electrically conductive waveguides having low resistivities can be used as signal lines for the transmission of radiofrequency signals. Suitable materials for radiofrequency (including microwave) waveguides include metals, such as gold, silver, and copper. Optical waveguides, which transmit wavelengths in the infrared region of the electromagnetic spectrum, are typically comprised of dielectric materials with high permitivities. Suitable materials for optical waveguides include silicon. The waveguides can have a variety of dimensions and cross-sectional shapes. However, in some embodiments of the switches, the waveguides are planar or strip waveguides.

The $VO_2$ layer can be used as a switch by applying an external stimulus to trigger the IMT. For example, heat can be applied to the $VO_2$ to raise its temperature above its $T_{crit}$ to trigger the phase transition. However, other external stimuli, such as an electric field, an optical field, a mechanical strain, or a combination thereof, can be applied to the $VO_2$ to induce the phase transition. These external stimuli shift the critical temperature for the IMT and induce the reversible phase transition, which changes the resistance (and, therefore, conductance) of the $VO_2$ and modulates the transmission of the electromagnetic waves through the material. An external stimulus can be provided by its corresponding external stimulus source, configured to apply IMT-inducing stimulus to the $VO_2$ layer. For example, an external heat source can be used to apply heat to the $VO_2$ layer, an external voltage source can be used to apply an electric bias to the $VO_2$ layer, and/or a mechanical actuator can be used to apply a mechanical strain to the $VO_2$ layer.

Some embodiments of the switches, including the radiofrequency switches, utilize the IMT-induced decrease in the $VO_2$ layer's resistivity and an accompanying increase in the transmission of the electromagnetic signal through the $VO_2$. Depending on the configuration of the switch, this can correspond to an increase in, or an attenuation of, the electromagnetic signal traveling through a waveguide. Switches that incorporate the $VO_2$ layers as switching layers include shunt switch configurations and series switch configurations.

Figures 4A, 4B:
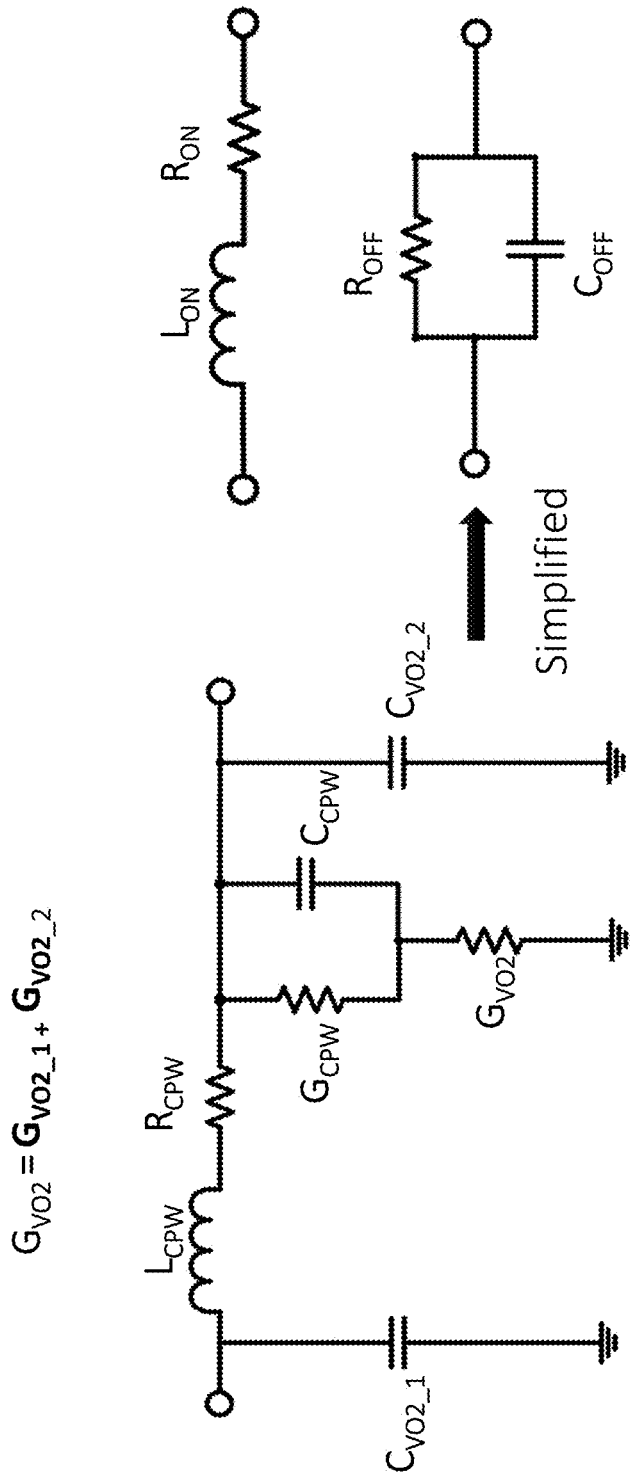
FIG. 4A shows an equivalent circuit model used to model $VO_2$ RF switches.
FIG. 4B shows a simplified equivalent circuit model for the switch operation. At room temperature, the switch is in the ON-state and can be simplified to an RL series circuit. At above the IMT temperature, the switch is in the OFF-state and can be simplified to an RC parallel circuit.
Figure 4C:
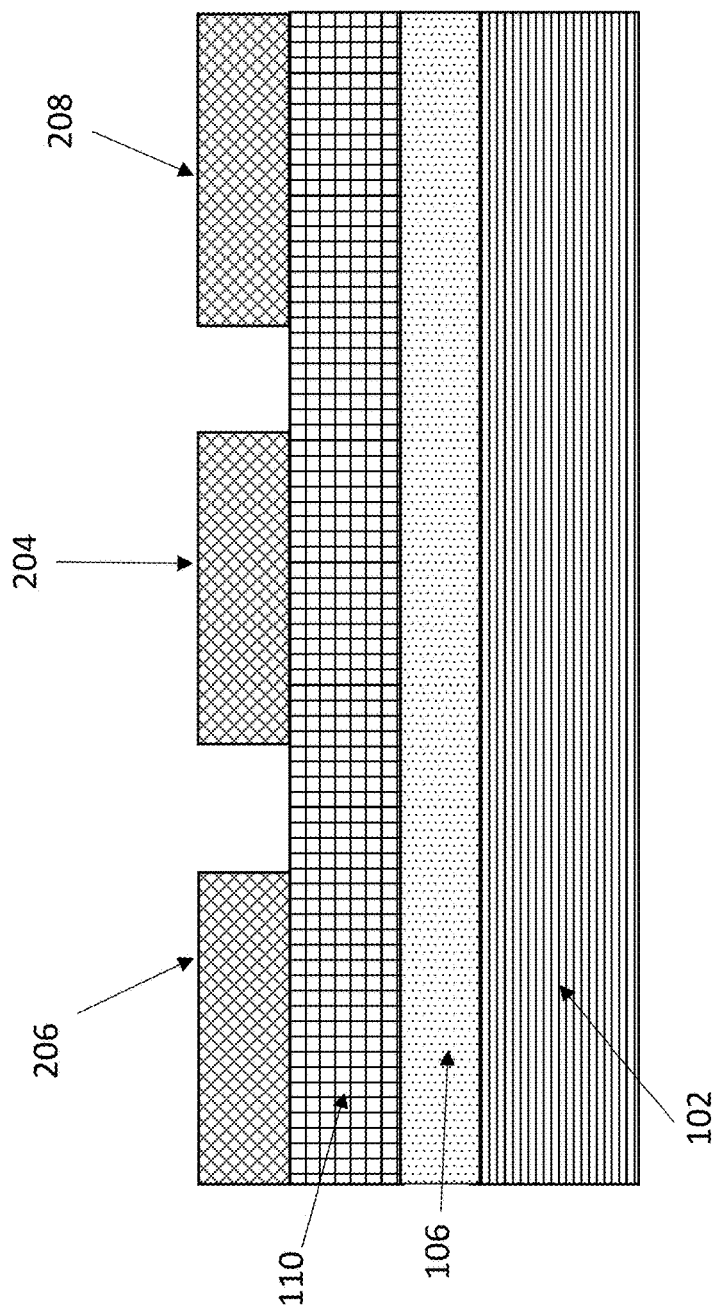
FIG. 4C is a schematic cross-sectional view of the RF switch.

A cross-sectional view of one embodiment of a shunt switch is shown schematically in FIG. 4C. The switch includes a layer of $VO_2$ 110 underlying a signal line 204 and two ground lines 206, 208, which are disposed on either side of the signal line. In this configuration, the signal line provides a continuous coplanar waveguide (CPW) for a radiofrequency signal. This embodiment of the switch further includes a $SnO_2$ template layer 106 and a $TiO_2$ substrate 102. In the shunt switch, the gap between the central signal line and the ground line of is bridged by the $VO_2$. When the $VO_2$ is in its insulating state, the $VO_2$ induces no (or low) losses in the radiofrequency signal propagating along the CPW. However, when the $VO_2$ transitions to its metallic state it short circuits the radiofrequency signal to ground and the propagation of the radiofrequency signal through the CPW is strongly attenuated, or even entirely blocked. A more detailed description of a shunt-type, $VO_2$-based radiofrequency switch is provided in Example 1.

Figure 6A:
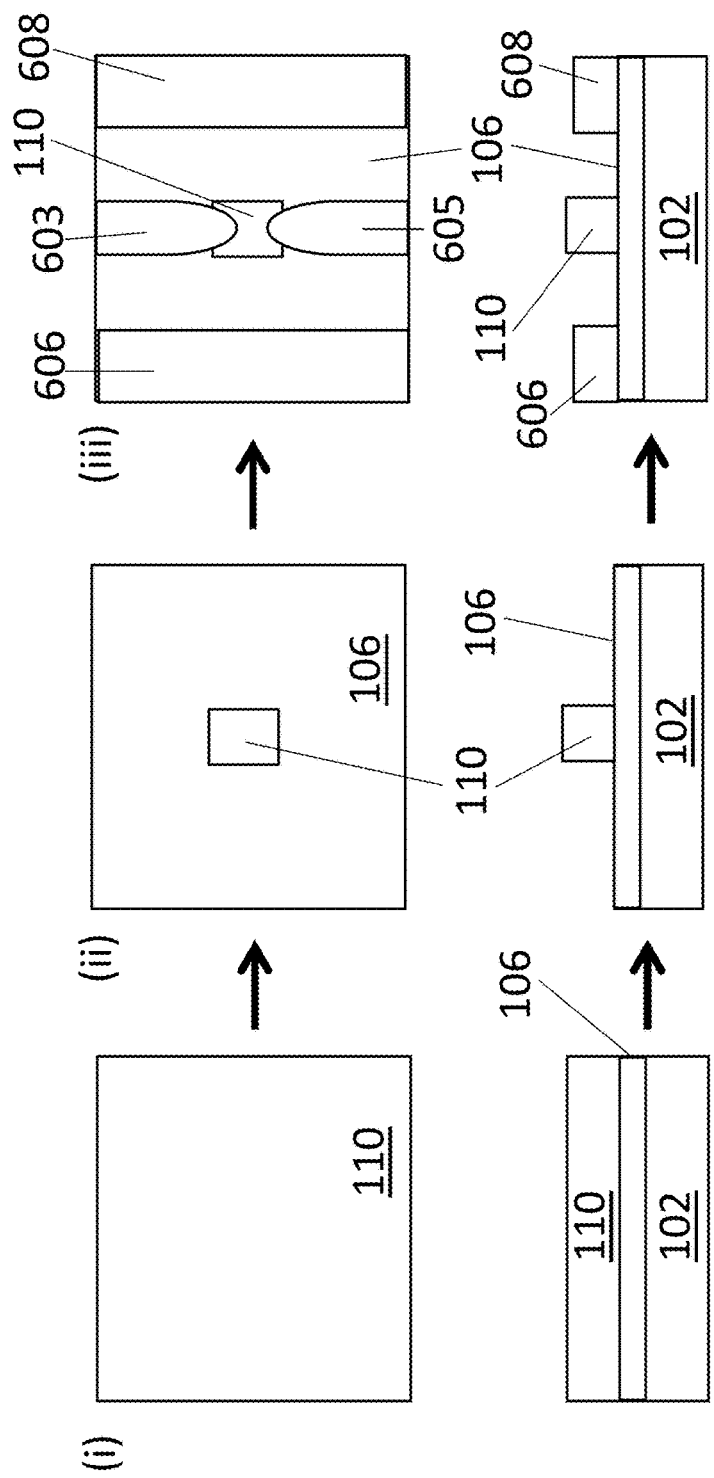
FIG. 6A is a schematic illustration of a fabrication process for a $VO_2$ RF switch.

A top view and a cross-sectional side view of one embodiment of a series switch are shown schematically in the upper and lower parts, respectively, of panel (iii) in FIG. 6A. The switch includes a layer of $VO_2$ 110 underlying a signal line and two ground lines 606, 608, which are disposed on either side of the signal line. In this configuration, the signal line provides a discontinuous coplanar waveguide (CPW) for a radiofrequency signal. The discontinuous CPW includes a first waveguide portion 603 and a second waveguide portion 605. This embodiment of the switch further includes a substrate, which may be, for example, the $SnO_2/TiO_2$ bilayered structure or another substrate onto which the $VO_2$ layer was subsequently transferred. In the series switch, the gap between the first waveguide portion and the second waveguide portion is bridged by the $VO_2$. When the $VO_2$ is in its insulating state, the $VO_2$ blocks (or at least strongly attenuates) the propagation of the radiofrequency signal from the first portion waveguide portion to the second waveguide portion. However, when the $VO_2$ transitions to its metallic state the radiofrequency signal is able to propagate from the first waveguide portion to the second waveguide portion through the $VO_2$ with no (or low) signal losses. A more detailed description of a series-type, $VO_2$-based radiofrequency switch is provided in Example 2.

Other embodiments of the switches, including the optical switches (optical modulators), utilize the IMT-induced decrease in the $VO_2$ layer's refractive index to optical signal absorption by the $VO_2$, thereby modulating the optical signal propagating through the optical waveguide that is in optical communication with the $VO_2$. Top views and cross-sectional side views of one embodiment of an optical switch are shown schematically in the upper and lower parts, respectively, of FIGS. 13A and 13B. The switch includes a layer of $VO_2$ 1310 underlying a signal line 1304 and two ground lines 1306, 1308, which are disposed on either side of the signal line. In this configuration, the signal line provides a continuous waveguide for an optical signal. This embodiment of the switch further includes a $SnO_2$ template layer 1306 and a $TiO_2$ substrate 1302. In the optical switch, the $VO_2$ is in optical communication with the optical waveguide when the $VO_2$ is in its insulating state. This is achieved by selecting a waveguide material having a refractive index that is similar enough to the refractive index of the insulating $VO_2$ to provide poor internal reflection at the waveguide/$VO_2$ interface and significant absorption of the signal by the $VO_2$. As a result, the propagation of the signal 1312 through the optical waveguide is blocked, or at least strongly attenuated, when the $VO_2$ is in its insulating state (FIG. 13A). When the $VO_2$ transitions to its metallic state 1314, its refractive index is significantly decreased, resulting in a high internal reflection of the propagating signal at the waveguide/$VO_2$ interface, so that the optical signal becomes tightly confined within the optical waveguide with no (or low) signal loss (FIG. 13B). Although not shown here, the exposed portions of the outer surface of the optical waveguide may be coated with a materials having a lower index of refraction than the optical waveguide material to improve the confinement of the optical signal within the optical waveguide. A more detailed description of a series-type, $VO_2$-based optical switch is provided in Example 3.

In some embodiments of the optical switches, the optical waveguide is single-crystalline silicon having a refractive index of approximately 3.4, the insulating $VO_2$ has a refractive index of approximately 3.1, and the metallic $VO_2$ has a refractive index of approximately 1.7. Some embodiments of the optical switches have a switching speed of 300 ns or faster. However, other optical waveguide materials can be used, provided that the material is able to transmit the signal and has a higher index of refraction than $VO_2$ in the wavelength range of interest. By way of illustration, suitable waveguide materials may have a refractive index that is at least about 1.5 times that of $VO_2$ in its metallic state. This includes materials having a refractive index that is at least about 2 times that of $VO_2$ in its metallic state.

Figure 14:
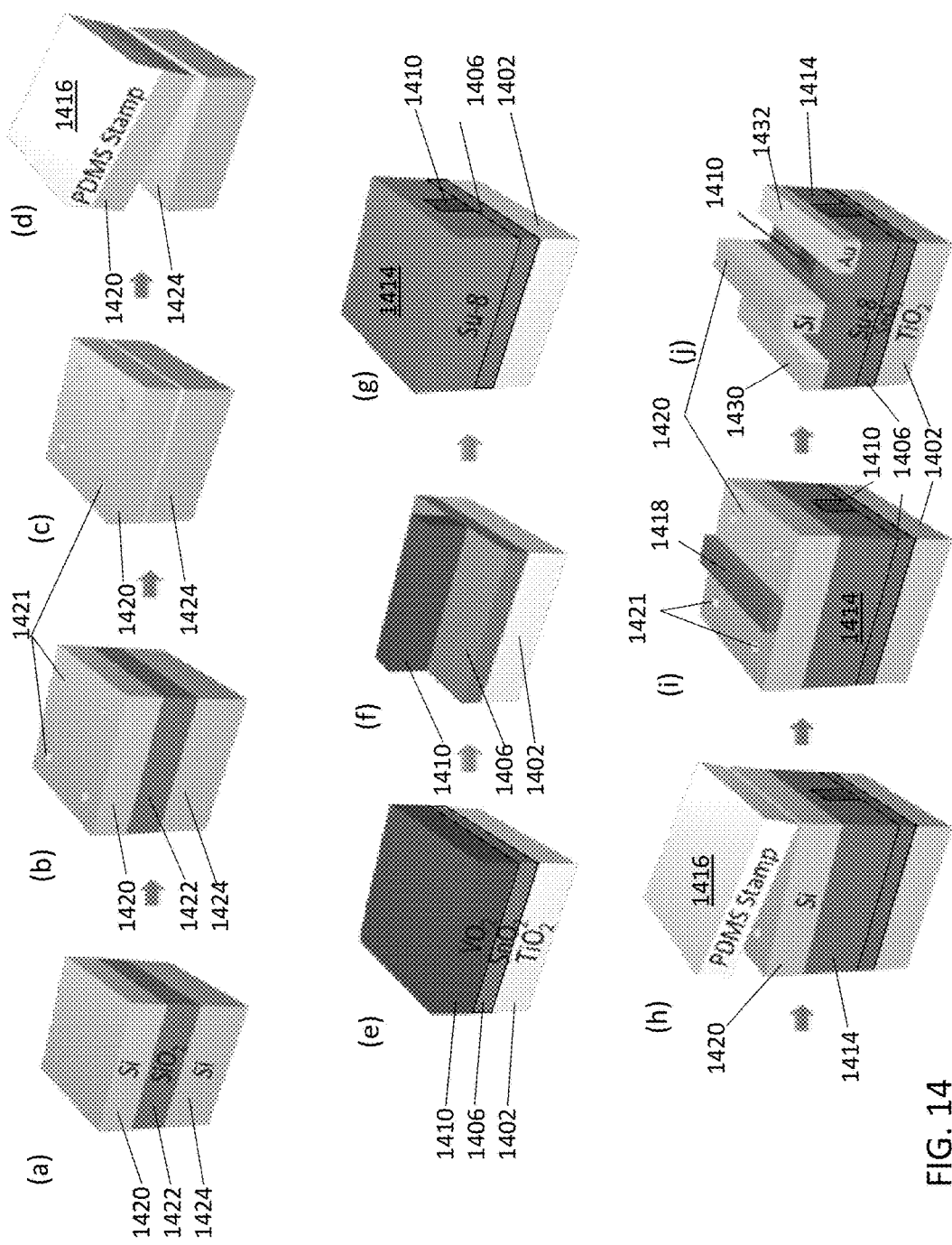
FIG. 14 is a schematic illustration of a method of formulating an optical switch.

A method for fabricating a $VO_2$ based optical modulator is shown schematically in FIG. 14. The method is described in detail in Example 3. Briefly, fabrication of the silicon waveguide starts with a silicon-on-insulator substrate (SOI) that includes a thin, single-crystalline layer 1420 separated from an underlying handle substrate 1424 by a buried silicon oxide layer 1422 (panel (a)). Single-crystalline layer 1420 is released from the SOI structure by selectively removing buried oxide layer 1422 (panel (b)). This can be accomplished by selectively removing the $SiO_2$ layer with HF etch, as described in Zhang, K., Seo, J.-H., Zhou, W. & Ma, Z. Fast flexible electronics using transferrable silicon nanomembranes. *J. Phys. D: Appl. Phys.* 45, 143001 (2012).

The $VO_2$ layer 1410 can be grown epitaxially on a $SnO_2/TiO_2$ structure 1406/1402 (panel (e)) as described herein and illustrated in the Examples. The $VO_2$ layer can then be patterned into a switching layer using, for example, a reactive ion etch (panel (f)). Optionally, an electrically conductive planarization and/or adhesion promoting layer 1414 can be formed over the $VO_2$ switching layer (panel (g)).

Using a transfer stamp, the released silicon layer then can transferred onto the planarization and/or adhesion promoting layer (panels (d) and (h)). An etch mask then can be formed over the transferred silicon layer (panel (i)). Finally, a waveguide can be patterned into the single-crystalline silicon and contact lines can be deposited over the planarization and/or adhesion promoting layer (panel (j)).

Example 1

In this example, thermally triggered RF switches are demonstrated using the $VO_2$ thin films on (001) $TiO_2$ (001) substrate with $SnO_2$ buffer layer. High quality epitaxial $VO_2$ thin films were employed to fabricate simple single-pole, single-throw (SPST) type switches that use the change in RF impedance by heating and cooling. The RF switching and power characteristics were measured under various temperatures and demonstrated sharp resistivity changes, with the scattering (S-) parameter $S_{21}$ greater than 15 dB at 60° C. and 66° C., when switches were heated up and cooled down, respectively. $VO_2$ RF switches also completed the transition of $S_{21}$ within 3° C. of the IMT temperature and showed a low loss operation frequency of up to 24.2 GHz with a low insertion loss of −1.36 dB and isolation of 17.56 dB at 12.03 GHz, respectively.

Figure 2A:
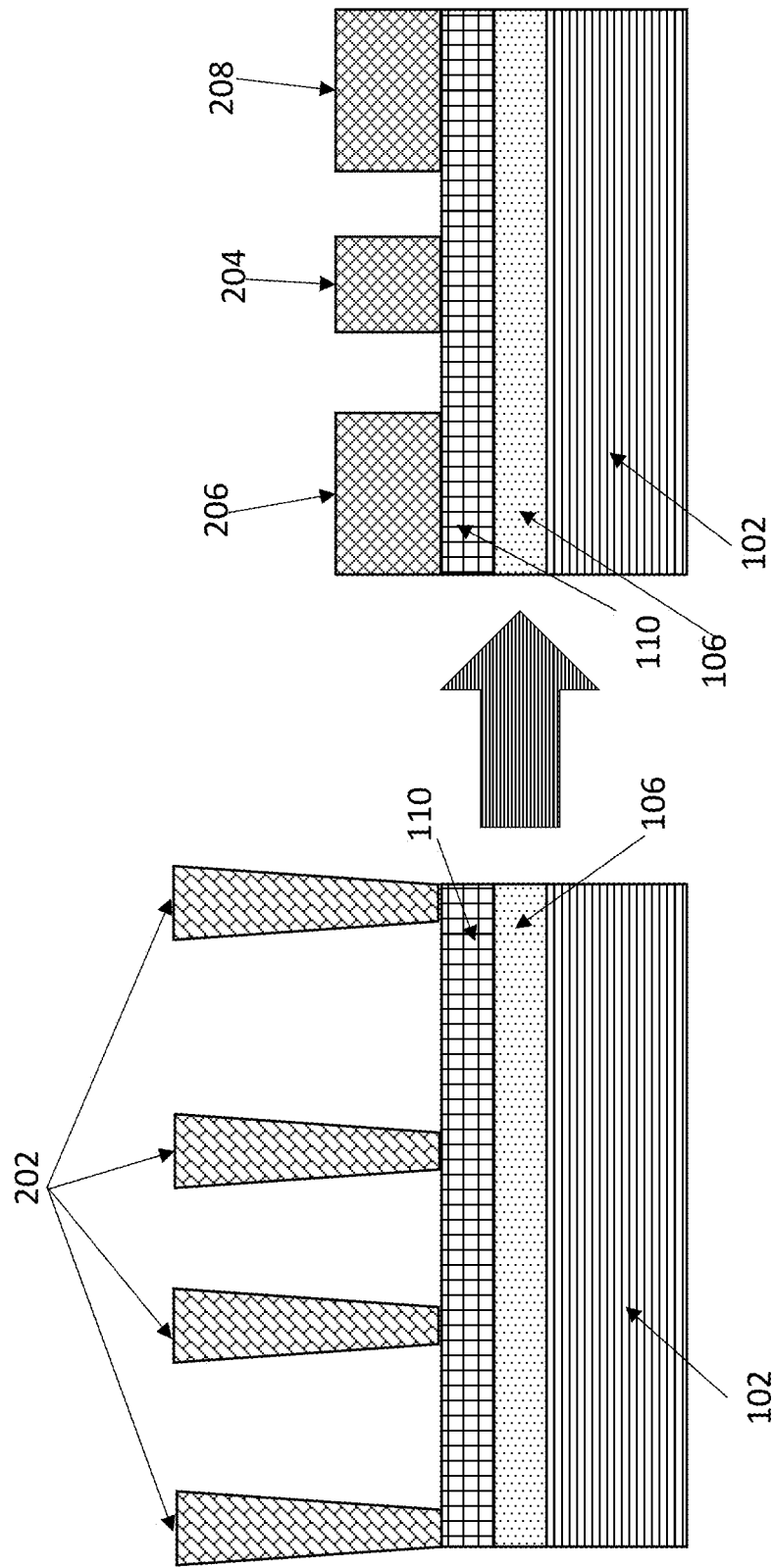
FIG. 2A is a schematic illustration of a fabrication process for an epitaxial $VO_2$ based RF switch.
Figure 2C:
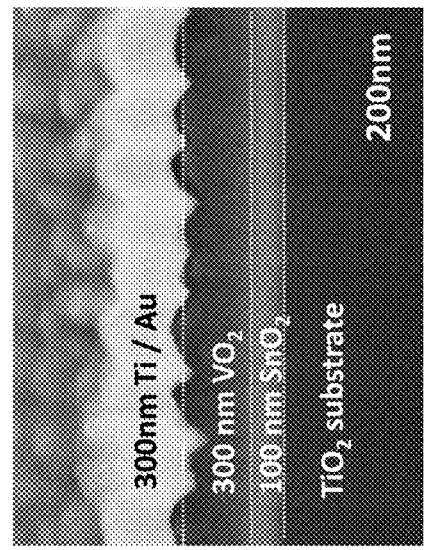
FIG. 2C shows a cross-sectional scanning electron microscope (SEM) image of the finished device.
Figure 2B:
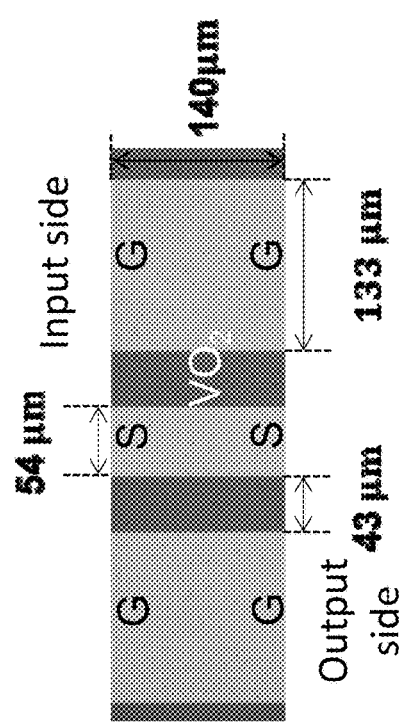
FIG. 2B is a microscopic image of the device and its dimensions.

The schematic illustration of the fabrication process is shown in FIG. 2A. The fabrication began with the epitaxial growth of the epitaxial $VO_2$ thin-film 110 on $TiO_2$ (001) substrate 102 with an $SnO_2$ buffer layer 106. (Details about the epitaxial growth and structural analyses can be found in Example 3.) Then, a photoresist 202 was patterned on $VO_2$ layer 110. A coplanar waveguide (CPW) signal line 204 and ground lines 206, 208 were then deposited on top of the $VO_2$ layer 110 (FIG. 2A(i)), by the deposition of a Ti/Au (10 nm/300 nm) metal stack by e-beam evaporation (FIG. 2A(ii)). FIG. 2B shows a microscopic image of the finished CPW transmission line. The widths of the signal line and ground lines were 54 μm and 133 μm, respectively, with a 43 μm spacing in between. The length of the device was 140 μm. It should be noted that the device structure and pad designs were optimized by using Keysight ADS 2013 momentum, considering the complex EM effects including skin effect, substrate effect, and RF losses between each layer. A cross-sectional scanning electron microscope (SEM) image in FIG. 2C shows 100 nm $SnO_2$ and 300 nm $VO_2$ layers.

The switching characteristics of the fabricated $VO_2$ RF switches were measured using an Agilent E8364A performance network analyzer (PNA) with the heating stage to control the sample temperature. Scattering (S) parameters in the frequency range from 45 MHz to 40 GHz were taken. The temperature was carefully controlled from room temperature (25° C.) to high temperature (90° C.) with 1° C. step during the measurement.

Figures 3A, 3B:
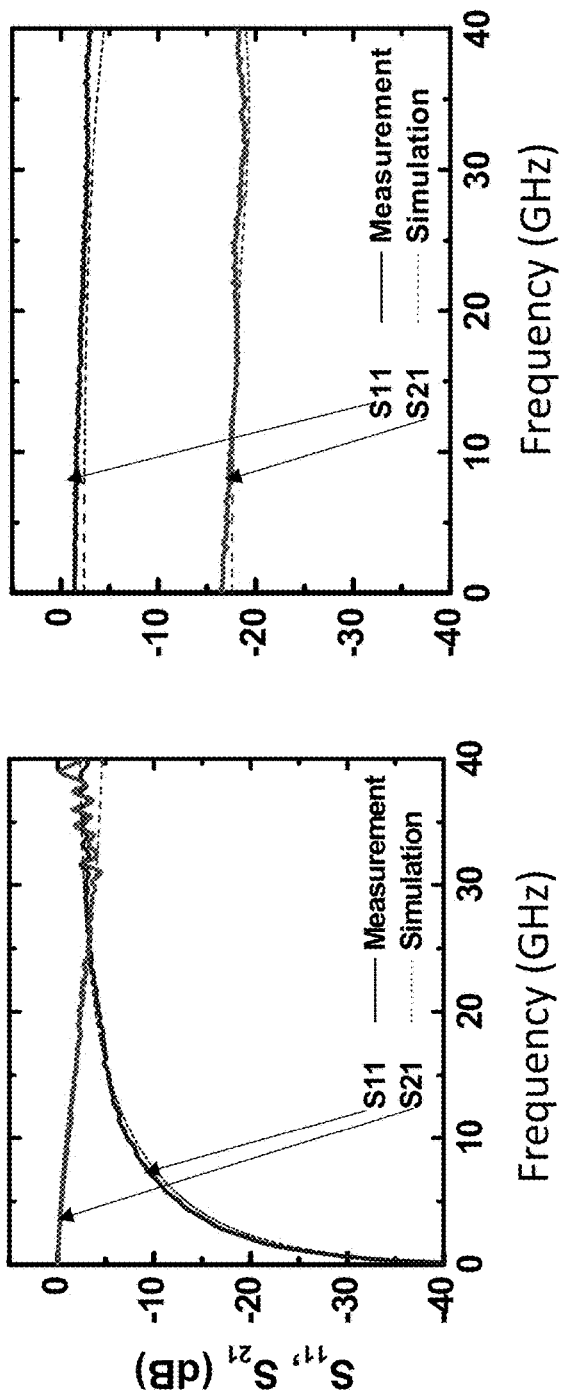
FIG. 3A depicts measured and simulated $S_{11}$ and $S_{21}$ characteristics of $VO_2$ RF switches in the ON-state.
FIG. 3B depicts measured and simulated $S_{11}$ and $S_{21}$ characteristics of $VO_2$ RF switches in the OFF-state under a frequency range of 45 MHz to 40 GHz.
Figure 3D:
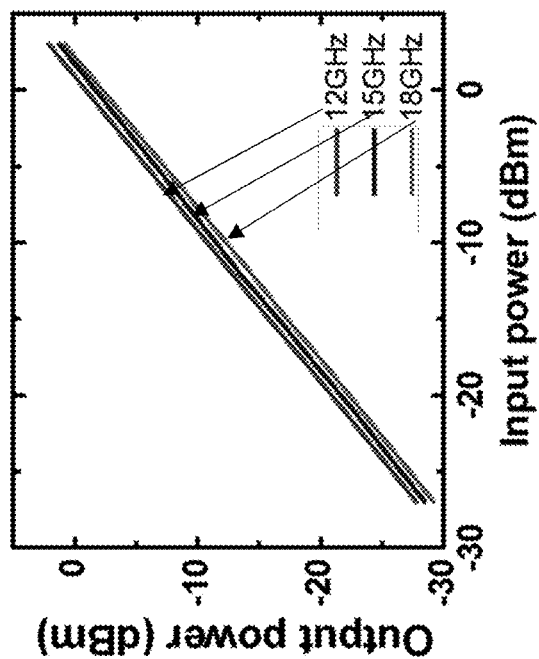
FIG. 3D shows the output RF power as a function of input RF power from −27 dBm to 3 dBm for various frequency points.
Figure 3C:
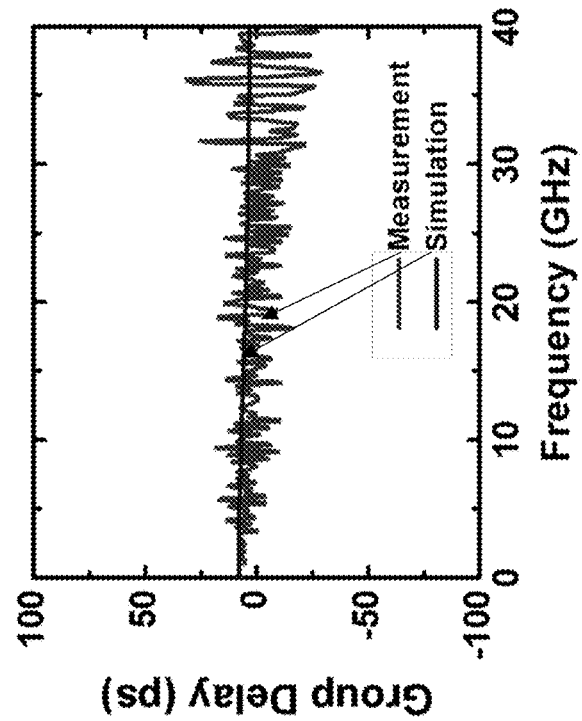
FIG. 3C depicts the measured and simulated group delay of the device.

FIGS. 3A and 3B show the measured and simulated RF characteristics of $VO_2$ RF switches when the device was at the ON- and the OFF-states. The return loss $S_{11}$ and the insertion loss $S_{21}$ were extracted. In FIG. 3A, the measured $S_{11}$ and $S_{21}$ show an operation frequency of up to 24.2 GHz (where $S_{21}$ is −3 dB) at 25° C. with relatively low RF losses, as low as −1.36 dB at 12.03 GHz, and −2.32 dB at 18.02 GHz. The simulated operation frequency of 23.33 GHz also matches well with the experiment results. FIG. 3B shows the RF characteristic above the phase transition temperature. Namely, the device was heated to 90° C., in order to make the $VO_2$ layer stay at the stable metallic state. At the metallic state, the resistivity of $VO_2$ decreases by ~4 to 5 orders of magnitude, which suppresses the transmission signal over a wide range of frequencies. The detailed mechanism of suppression of the signal transmission is described below. At the OFF-state, $S_{21}$ characteristics showed a similar low level of −16.49 dB transmission at 45 MHz and −18.05 dB at 40 GHz. The simulated RF characteristics at the OFF-state also showed a similar low level as compared to the measured result. The group delay is one of the important parameters to evaluate the phase distortion of the signal by measuring the average travel time at a certain signal frequency to travel through the device under operation. FIG. 3C shows the measured group delay of $VO_2$ RF switches at the ON-state. The spikes referring to the group delay ripples and the average delay represents the amount of time for a certain frequency signal to travel from the signal port to the ground port through the device under operation. The measured average delay is 2.49 ps. The highest group delay ripple is 32 ps and the lowest value is −29 ps. The simulated average delay is 3.74 ps, with 8.32 ps being the highest group delay ripple and 3.4 ps being the lowest value. The small group delay indicates that the $VO_2$ RF switches were stable over the frequency range, making this device suitable for a switching element up to Ku-band RF switching circuits. In FIG. 3D, output power was measured as a function of input power for various frequencies in Ku-band (i.e., at 12 GHz, 15 GHz, and 18 GHz, respectively) at the ON-state. A power range from −27 dBm to 3 dBm from PNA was used as an input power source and the signal was read through the spectrum analyzer (Agilent E4407B). VO$_2$ RF switches exhibit linear RF power characteristics, and compression was not shown for the entire input power range at the ON-state. As the input signal frequency increases, output power decreases due to the insertion loss increase.

When the dimensions of VO$_2$ RF switches were designed, the following factors were considered. Firstly, most of the TE field is concentrated in the VO$_2$ layer, as the magnetic field in CPW is elliptically polarized. Secondly, since the VO$_2$ layer has a high dielectric constant (ε=40.6 at 10 Hz), it effectively reduces radiation losses. Taken together, the optimized CPW structure can be used for high frequency signal switching devices with thermally controlled phase transition of VO$_2$. FIG. 4A represents the equivalent circuit model that was used to model the VO$_2$ RF switches to further analyze the RF signal switching mechanism. FIG. 4B shows a simplified equivalent circuit model for the switch operation. Each component value of the equivalent circuit was obtained by curve fitting the measured S-parameters. Shown in Table 1 are the equivalent component values of VO$_2$ RF switches at the ON- and OFF-states.

TABLE 1

| Components | 25° C. On (Insulator) | 90° C. Off (Metallic) |
| --- | --- | --- |
| $L_{CPW}$ (pH) | 79 | 1650 |
| $R_{CPW}$ (Ω) | 1.2 | 480 |
| $G_{CPW}$ (S) | 800 | 200 |
| $C_{CPW}$ (fF) | 180 | 3 |
| $G_{VO2}$ (S) | $2.5 \times 10^{-5}$ | $2.5 \times 10^{-2}$ |
| $C_{VO2\_1}$ (fF) | 30 | 2 |
| $C_{VO2\_2}$ (fF) | 30 | 2 |

The $L_{CPW}$, $R_{CPW}$, $G_{CPW}$, and $C_{CPW}$ values in Table 1 refer to the equivalent components of the lossy CPW line. The VO$_2$ layer is represented as $G_{VO2}$ for the real part of the loss, and $C_{VO2\_1}$ and $C_{VO2\_2}$ as the imaginary part of the loss. When VO$_2$ RF switches operate at the ON-state, RF signal can be transmitted with the low real part insertion loss ($R_{CPW}$) as low as 1.2Ω. On the other hand, when VO$_2$ RF switches operate at the OFF-state above the phase transition temperature, the VO$_2$ layer turns into its metallic phase with nearly 4 orders[17] of magnitude lower resistance and thus VO$_2$ RF switches behave as an attenuator. The reduced resistance of the VO$_2$ layer at the OFF-state becomes a dominant loss part which is in series with the real losses of CPW line components. As a result, the $R_{CPW}$ increases to 480Ω, which effectively attenuates the signal. Based on the equivalent circuits, the figure-of-merit of the RF switch, the cut-off frequency ($F_{co}$), is calculated based on the following equation (1)[22], $$F_{co} = \frac{1}{2\pi R_{on} C_{off}} \quad (1)$$

where, $R_{on}$ and $C_{off}$ are the resistance at the ON-state and the capacitance at the OFF-state, respectively. In this calculation, an $R_{on}$ of 1.2Ω and $C_{off}$ of $7 \times 10^{-15}$ F were used and yielded a $F_{co}$ value of 18.9 THz.

Figures 5A, 5B:
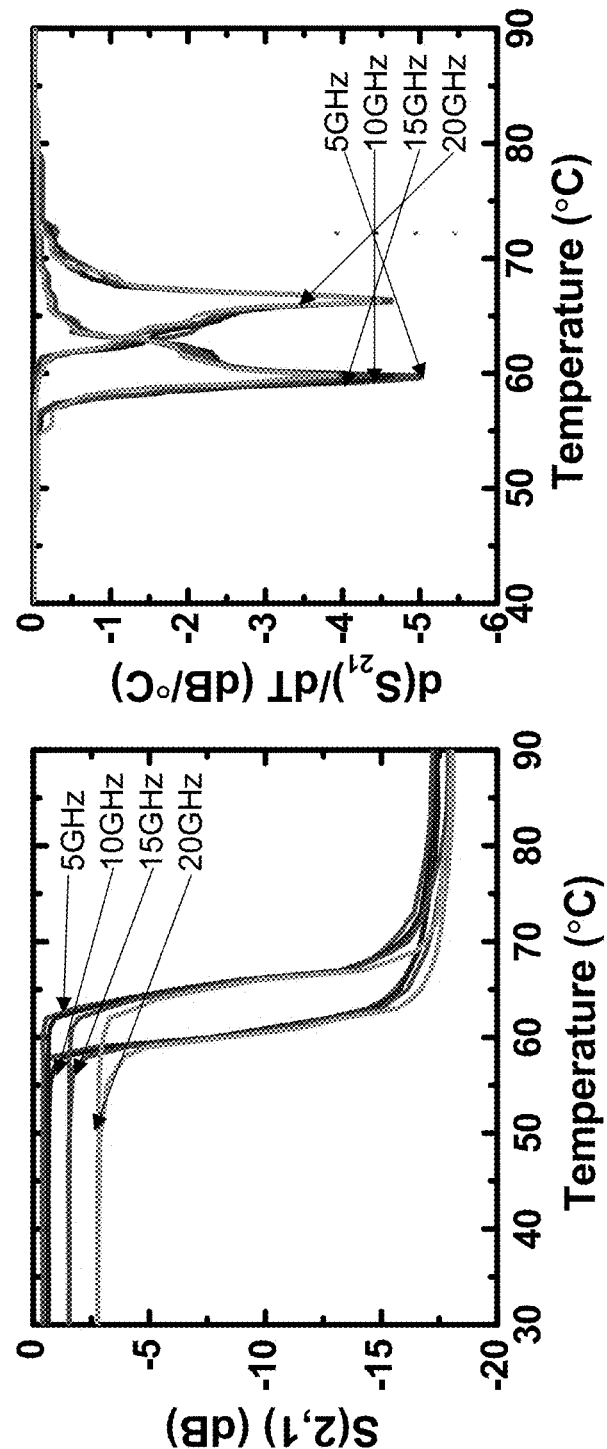
FIG. 5A depicts $S_{21}$ curves for $VO_2$ RF switches under heating and the cooling cycles by thermally triggered IMT.
FIG. 5B depicts derivatives of the $S_{21}$ curve, $d(S_{21})/dT$, to show the peaks and FWHM of the IMT curves.

The $S_{21}$ value as a function of temperature in the range from room temperature to 90° C. is shown in FIG. 5A. VO$_2$ RF switches were heated and cooled at various frequency points (namely, 5, 10, 15, and 20 GHz) to investigate the IMT point. For all frequencies, transitions in $S_{21}$ for both heating and cooling sequences occurred at the same temperature, which is the same transition temperature as the resistivity change. In order to further analyze the phase transition characteristic, the derivative of $S_{21}$ is plotted in FIG. 5B. IMT points for heating and cooling cycles can be clearly observed at 66° C. and 60° C., respectively, with the 6° C. hysteresis loop gap in all frequency ranges. The $S_{21}$ based full width at half maximum (FWHM) of IMT is less than 3° C. for both heating and cooling cycle, which confirms that IMT in this structure exhibits a similar sharp transition property to that of the bulk sample. However, the 3° C. transition value based on $S_{21}$ is still wider than the resistivity-based FWHM value. While resistivity transition only involves the DC component of the VO$_2$ layer, the transition based on $S_{21}$ (i.e., a phase transition in the microwave regime) involves parasitic capacitance of the VO$_2$ layer, and thus results in a wider transition temperature.

In conclusion, thermally triggered "normally ON" RF switches were demonstrated based on epitaxial VO$_2$ thin film with a very simple device structure. The high quality epitaxial VO$_2$ thin film was realized by using an SnO$_2$ template layer in between the VO$_2$ layer and TiO$_2$ substrate. The thin film VO$_2$ exhibited a similar sharp phase transition to that of the bulk VO$_2$. A fast insulator-to-metal phase transition at a low temperature allowed VO$_2$ RF switches to exhibit sharp resistivity changes with the $S_{21}$ change greater than 15 dB at 60° C. and 66° C. when switches were heated up and cooled down, respectively. VO$_2$ RF switches performed the sharp transition of $S_{21}$ less than 3° C. and showed a low loss operation frequency up to 24.2 GHz with a low insertion loss of −1.36 dB and isolation of 17.56 dB at 12.03 GHz.

Example 2

In this example, electrically triggered RF switches were demonstrated using the epitaxial VO$_2$ thin films on a TiO$_2$ (001) substrate with a SnO$_2$ template layer. The high quality epitaxial VO$_2$ thin film was employed to fabricate simple single-pole single-throw (SPST) type switches. DC characteristics of the VO$_2$ RF switches were measured and compared to RF switching performances of switches through heat and voltage bias. The electrical IMT was also measured by a continuous square wave voltage bias and characterized the switching speed of the VO$_2$ RF switches.

Figure 6B:
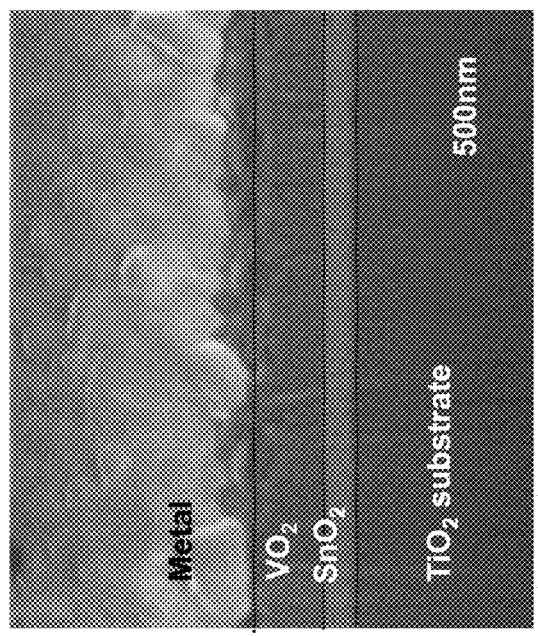
FIG. 6B shows a microscopic image of a finished RF switch.
Figure 6C:
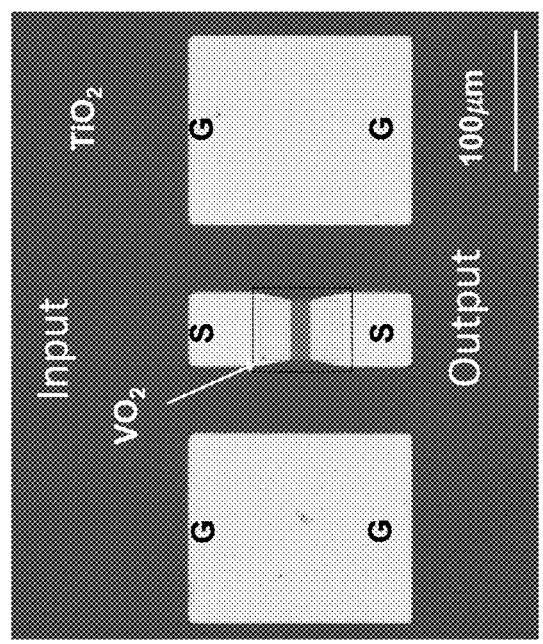
FIG. 6C is a cross-sectional scanning electron microscope (SEM) image of the finished device.

FIG. 6A shows the schematic illustration of the fabrication process. The VO$_2$ layer and the SnO$_2$ buffer layer were epitaxially grown on a TiO$_2$ (001) substrate by Pulsed Laser Deposition PLD (FIG. 6A(i)), followed by patterning of the VO$_2$ layer using photolithography and reactive ion etching (RIE) (FIG. 6A(ii)). Finally, microwave coplanar waveguide (CPW) lines were defined by e-beam evaporation (Ti/Au, 10 nm/300 nm) (FIG. 6A(iii)). A microscopic image of the finished device is shown in FIG. 6B. The device structure and CPW design were simulated and optimized using a Keysight ADS 2013 momentum. The length of the entire device, from input to output, was 140 μm, while the width of the signal line and the ground line were 54 μm and 133 μm, respectively, with 43 μm spacings between the signal and ground lines. The two signal lines at input and at output were separated with 10 μm spacings on the VO$_2$ layer. In FIG. 6C, a cross-sectional scanning electron microscope (SEM) image shows 100 nm SnO$_2$ buffer and 300 nm VO$_2$ layers. Details about the epitaxial growth and structural analyses can be found in Example 3.

Figures 7A, 7B:
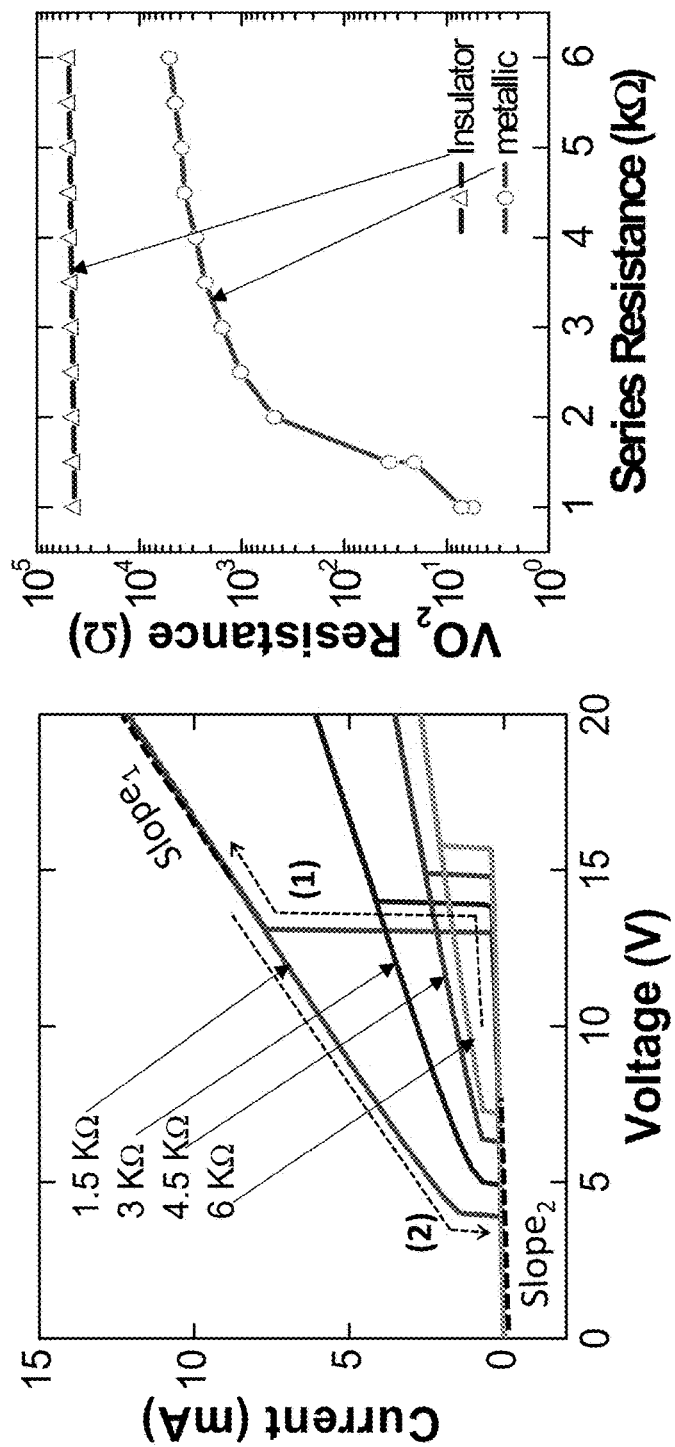
FIGS. 7A and 7B show DC characteristics of $VO_2$ RF switches as follows.

After device fabrication, the electrical characteristics were measured using the HP 4155 semiconductor parameter analyzer in ambient air. FIG. 7A shows current-voltage (I-V)

characteristics of an electrically triggered IMT VO$_2$ switch obtained by double sweeping DC voltage bias to the device in series with various series resistors (R$_s$) from 1 kΩ to 6 kΩ to prevent damage from excessive current. Initially, the VO$_2$ layer under low voltage bias had a high resistance insulator phase that resulted in a very low current. However, when the voltage reached the threshold value for IMT phase transition (V$_{IMT}$), the VO$_2$ became metallic and the current was dramatically increased, which corresponds to path (1) in FIG. 7A. It is worth noting that the current level was increased as the value of the series resistor was decreased because total resistance across the device was decreased. Consequently, the V$_{IMT}$ was reduced from 15.7 V to 13.1 V, as the series resistance value was decreased from 6 kΩ to 1.5 kΩ. The voltages for metal to insulator phase transition (V$_{IMT}$) were also varied from 7.2 V with a 6 kΩ series resistor to 3.9 V with a 1.5 kΩ series resistor. The resistances of the VO$_2$ layer at the insulating phase and the metallic phase were carefully extracted from the slope of each I-V curve with different series resistance values. For example, resistances of the VO$_2$ layer with 1.5 kΩ series resistor at the metallic phase and the insulating phase are displayed as slope$_1$ and slope$_2$, respectively, in FIG. 3A. Then, as shown in FIG. 7B, the final resistance values of the VO$_2$ layer as a function of different series resistance values were calculated using the following formula: R$_{VO2}$=(dV/dI)−R$_S$. Interestingly, it was found that the resistance of the VO$_2$ layer at the metallic state was significantly increased with the series resistor of larger values, while the VO$_2$ resistance remained the same at the insulating state. This trend is largely attributed to the incomplete phase transition of the VO$_2$ layer under a small current flow and electric field. When the voltage bias was applied to the VO$_2$, carriers were injected and a narrow local metallic path was formed in the VO$_2$. With time, the metallic area expanded and, eventually, the entire layer went through a phase transition. Thus, large series resistors were found to suppress the current level and result in a partial phase transition in VO$_2$. The VO$_2$ resistance with a 1 kΩ series resistor was 5.5Ω and 4.3 kΩ, at the metallic and the insulator phases, respectively. Nearly 4 orders of magnitude change in resistance was observed, which is comparable to the device made of single crystal bulk VO$_2$. The large resistivity change by electrical excitation in this work is also comparable to that of thermal excitation. This confirms that the electrical phase transition is as complete as the thermal one.

The switching performance of the VO$_2$ RF switches was characterized by measuring scattering (S-) parameters under the frequency range from 45 MHz to 40 GHz using the Agilent E8364A performance network analyzer (PNA). The VO$_2$ RF switches were tested and compared for both thermal and electrical triggers. A temperature-controlled stage was used for thermally triggered VO$_2$ RF switch measurements. In order for the VO$_2$ to be in a fully metallic phase, the sample temperature was increased to 90° C., which is above the phase transition temperature of ~68° C. for VO$_2$. To measure electrically triggered VO$_2$ RF switches, a 15 V DC bias was applied to the VO$_2$ RF switches in series with a 1 kΩ resistor via a bias T using the HP E3631A power supply. Also, the VO$_2$ RF switches were simulated with Keysight ADS 2013 momentum.

Figures 8A, 8B:
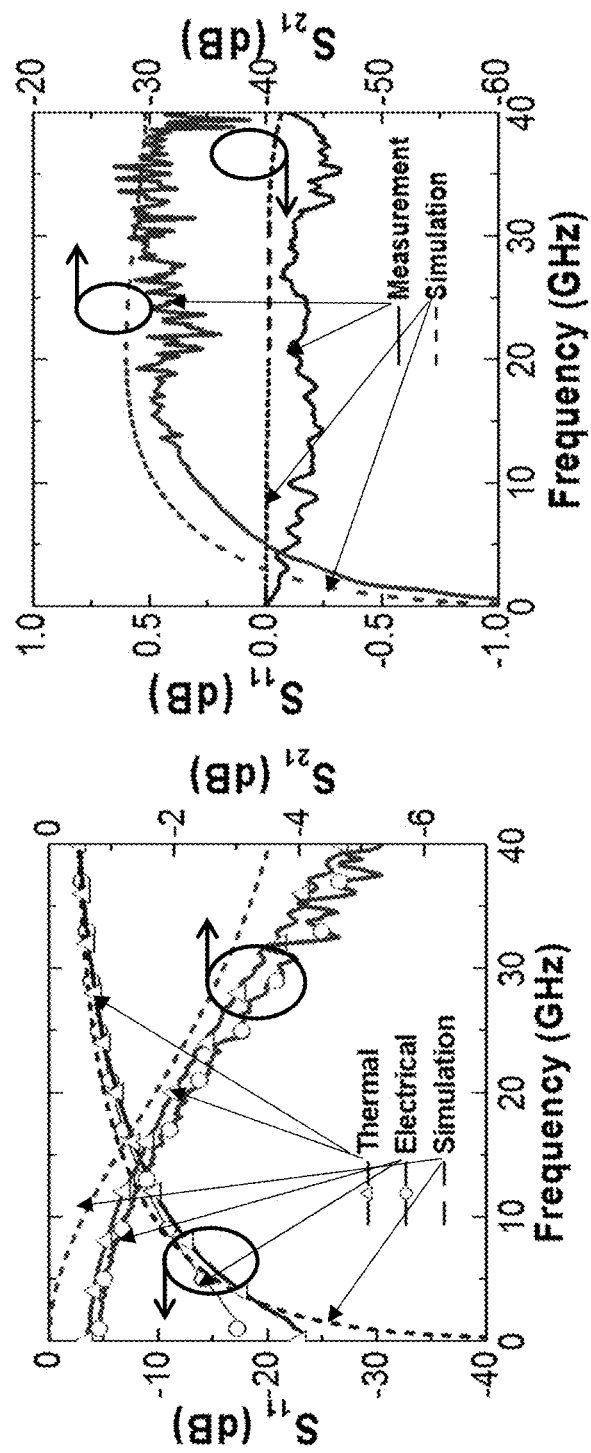
FIG. 8A shows measured and simulated $S_{11}$ and $S_{21}$ parameters of $VO_2$ RF switches in the frequency range from 45 MHz to 40 GHz in the on-state.
FIG. 8B shows measured and simulated $S_{11}$ and $S_{21}$ parameters of $VO_2$ RF switches in the frequency range from 45 MHz to 40 GHz in the off-state in a frequency range of 45 MHz to 40 GHz.

Measured and simulated RF characteristic of the VO$_2$ RF switches at the on- and off-states are shown in FIG. 8A and FIG. 8B. The results clearly indicate that the VO$_2$ RF switches changed to the on-state when voltage bias was applied beyond V$_{IMT}$ across the VO$_2$ layer or when the sample was heated above the transition temperature (T$_{IMT}$). Once the phase transition to the metallic state occurred, the microwave signal could be transmitted through the VO$_2$ CPW which then became conductive. FIG. 8A shows the RF characteristics of VO$_2$ RF switches at the on-state. The insertion loss (S$_{21}$) of −3 dB was measured at 24.3 GHz and 27.7 GHz for electrically and thermally activated RF switches, respectively, which confirms a successful phase transition of the VO$_2$ layer by both methods. The return losses (S$_{11}$) of VO$_2$ RF switches were measured to be −4.7 dB at 24.3 GHz and −4.3 dB at 27.7 GHz for electrically and thermally activated RF switches, respectively. The VO$_2$ RF switches changed to the off-state when switches were below the phase transition temperature or without voltage bias. FIG. 8B shows the RF characteristics of VO$_2$ RF switches at the off-state. S$_{21}$ characteristics at the off-state showed low insertion loss of −25 dB over the entire frequency range. The simulated RF characteristics at the off-state agreed well with measured RF characteristics.

Figures 8C, 8D:
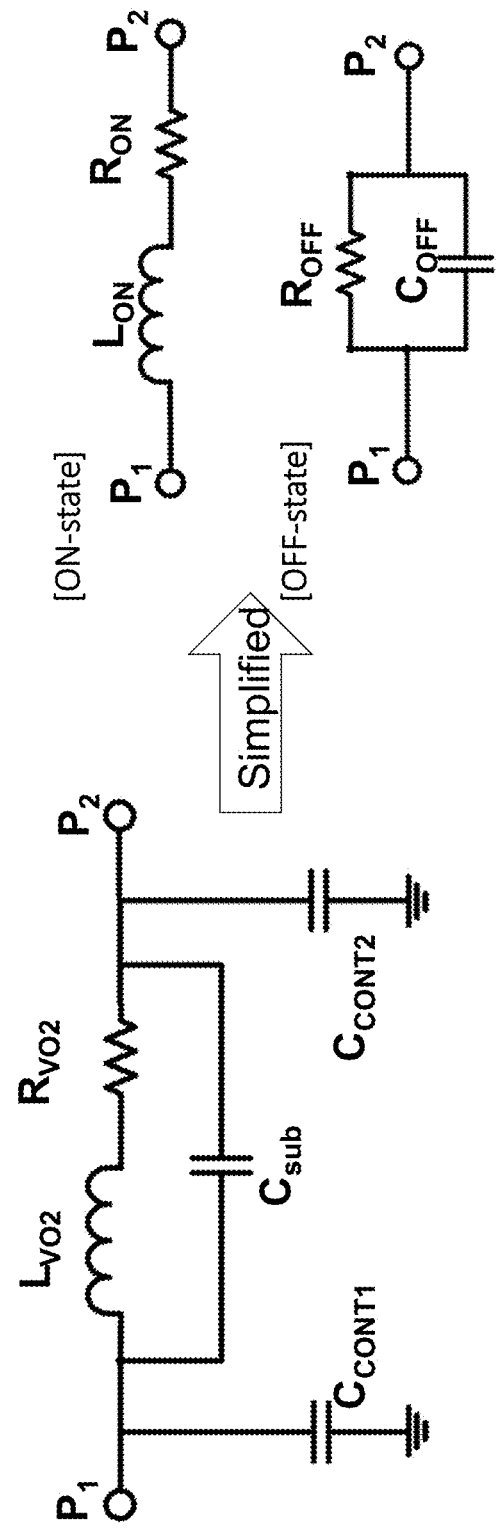
FIG. 8C shows an equivalent circuit model used to model $VO_2$ RF switches.
FIG. 8D depicts a simplified equivalent circuit model for the switch operation. The device is simplified to the RL series circuit in the ON-state and the RC parallel circuit in the OFF-state.

To further analyze RF switching characteristics, the two-port equivalent circuit model of the VO$_2$ RF switches were employed as shown in FIG. 8C. The parameters of each component in the equivalent circuit were extracted from the measured s-parameter from 45 MHz to 40 GHz. In the equivalent circuit model, C$_{Sub}$ modeled the parasitic capacitance of the VO$_2$ signal line, R$_{VO2}$ and L$_{VO2}$ are the intrinsic resistance and reactance of the VO$_2$ layer, and C$_{CONT1}$ and C$_{CONT2}$ are the parasitic capacitance between metal pads and the SnO$_2$/TiO$_2$ substrate. The parameters of each component at both the on- and off-states are shown in Table 2. Simplified equivalent circuits are illustrated in FIG. 8D. As the resistance of the VO$_2$ changed during the phase transition, two different simplified equivalent circuits were modeled for the on- and off-states. When the VO$_2$ RF switches operated at the off-state, it behaved as a parallel RC circuit with a resistance of 46 kΩ which blocked RF signals efficiently through the CPW line. On the other hand, at the on-state, the resistance of the device reduced to 4.6Ω, which is similar to a series RL circuit. The calculated resistance difference between the on-state and the off-state is about 4 orders of magnitude, which agrees well with the measured resistance in FIG. 7B. The intrinsic cut-off frequency (F$_{co}$) is one of the key values in deciding the highest operation frequency and can be calculated by the following equation, F$_{CO}$=1/(2·π·R$_{on}$·C$_{off}$), where R$_{on}$ and C$_{off}$ are the resistance at the on-state and the capacitance at the off-state, respectively. The VO$_2$ RF switches exhibit an R$_{on}$ of 4.6Ω and C$_{off}$ of 1.99 fF, resulting in an F$_{co}$ of 17.4 THz.

TABLE 2

| Components | On (Metallic) | Off (Insulator) |
|---|---|---|
| L$_{VO2}$(pH) | 555 | — |
| R$_{VO2}$ (Ω) | 4.6 | 4.6 × 10$^4$ |
| C$_{SUB}$(fF) | — | 2.7 |
| C$_{CONT1}$ (fF) | 15 | 15 |
| C$_{CONT2}$ (fF) | 15 | 15 |

One of the clear advantages of an electrical triggering method is that the transition can be completed much faster than other triggering methods, such as by heating or by shining light. Considering that the electrical phase transition occurs by current injection followed by joule heating, a theoretical minimum switching time, t$_{min}$, for the electrical phase transition can be calculated by using a simple thermal model with the following equation (1), $$t_{min} = \frac{\rho_{VO2} * C_{VO2} * \text{volume} * \Delta T}{I * V} \quad (1)$$

where $\rho_{VO2}$ is the density of $VO_2$ (4340 kg m$^{-3}$), $C_{VO2}$ is the heat capacity of $VO_2$ (690 J kg$^{-1}$ K$^{-1}$), volume is the dimension of $VO_2$ (54 μm*10 μm*300 nm), $\Delta T$ is the temperature change of the film (341 K−298 K=43 K), V and I are voltage and current at the phase transition (13.1 V and 7.7 mA, respectively, from FIG. 3A). The calculated $t_{min}$ is 206 ns.

Figures 9A, 9B:
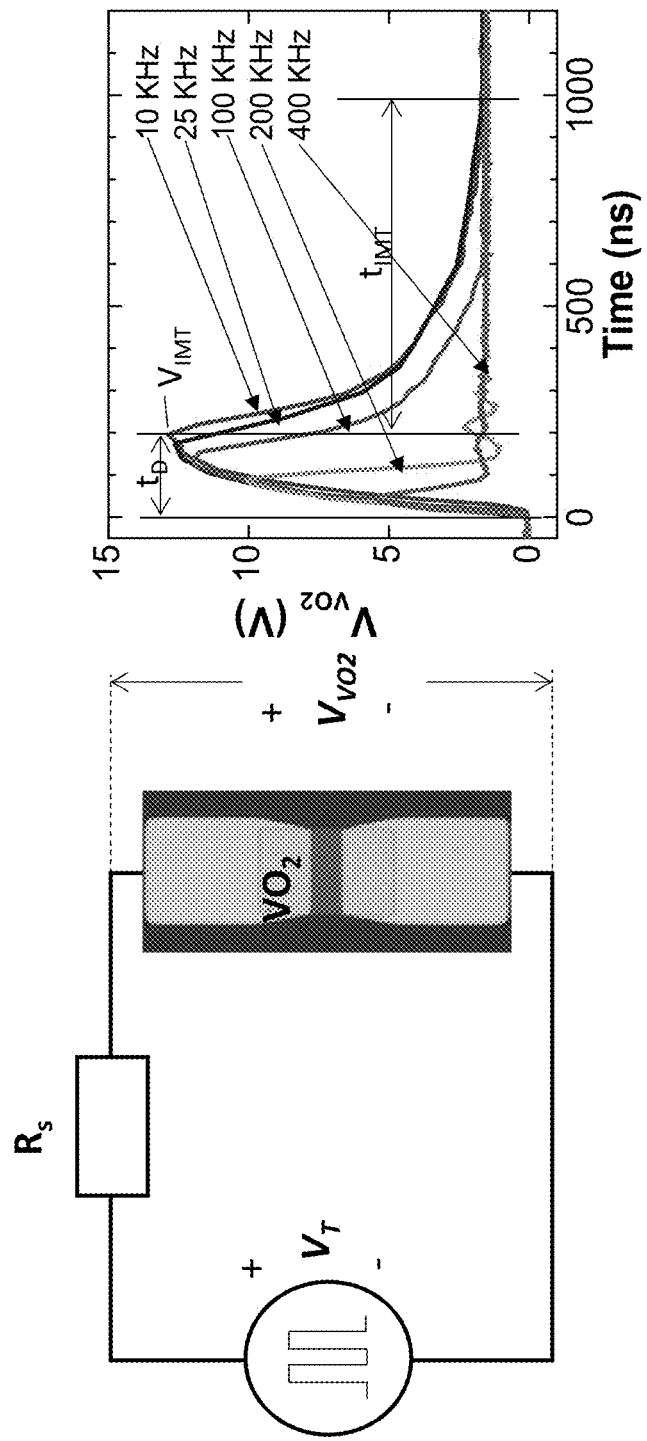
FIG. 9A shows a circuit schematic used to measure phase transition time.
FIG. 9B the depicts voltage response of the $VO_2$ RF switch with a 1 kΩ series resistor connected under various frequencies from 10 kHz to 400 kHz.

In order to calculate actual phase transition time, the dynamic response measurements under different frequencies were performed by configuring the circuit as shown in FIG. 9A. Continuous square wave voltage under various frequencies from 10 kHz to 400 kHz was applied using the function generator (Tektronix FG5010) to the $VO_2$ RF switch in series with a 1.5 kΩ resistor. The voltage drop on the entire circuit ($V_T$), and the voltage drop only by the $VO_2$ ($V_{VO2}$) were monitored by a digital oscilloscope (Tektronix TDS2014B). The dynamic response of the $VO_2$ RF switches is shown in FIG. 9B. When the $VO_2$ switch was at the insulator state (i.e., before reaching a $V_{IMT}$), the resistance of the $VO_2$ switch was much larger than the resistance of the series resistor. Thus, most of the voltage drop occurred at the $VO_2$ switch. As applied voltage reached $V_{IMT}$, the $VO_2$ switch became metallic, and the resistance of the $VO_2$ switch was abruptly decreased. Consequently, the voltage drop across the $VO_2$ switch was also decreased. The time required for the electrical phase transition is a combination of the delay time ($t_D$) and the actual insulator-to-metal transition time ($t_{IMT}$). $t_D$ indicates the time required for the voltage drop on the $VO_2$ layer to reach $V_{IMT}$, which can be further reduced by employing a sharper voltage waveform and smaller series resistor. $t_{IMT}$ represents the duration of the phase transition. During this time, the $VO_2$ layer exhibited a sharp resistance drop. $T_{IMT}$ can be expressed as $t_{IMT}=\tau_0+RC$, where $\tau_0$ is the intrinsic rise time and RC is the RC time delay. As $V_{VO2}$ reached $V_{IMT}$, the filamentary low resistance current path was formed between the electrodes. (See, Y. Zhao, J. Hao, C. Chen and Z. Fan, Journal of Physics: Condensed Matter 24 (3), 035601 (2011).) Over time, the current path expanded from current injection and joule heating so that the phase transition of the entire $VO_2$ layer was complete. $t_D$ and $t_{IMT}$ for $VO_2$ RF switches with 1 kΩ series resistors were ~180 ns and ~840 ns, respectively. As the input frequency increased, both $V_{IMT}$ and $t_{IMT}$ decreased. Also, as the frequency increased, intervals between voltage pulses also decreased so that latent heat from joule heating was not completely dissipated. Such estimations also indicate that the switching speed is largely dependent on the $t_{IMT}$ value.

The calculated minimum switching time, $t_{min}$, is approximately 4 times smaller than the measured result. Considering that joule heating is not the only factor that affects the phase transition and the actual device temperature increased above the phase transition temperature, the calculated result is acceptable. However, this result is still several times faster than poly-crystal $VO_2$-based RF switches. Since both $V_{IMT}$ and $t_{IMT}$ are highly dependent on the dimension of the $VO_2$, the switching speed can be further enhanced by engineering the geometry of the device.

In conclusion, electrically triggered RF switches based on epitaxially grown $VO_2$ thin films with a simple device structure were demonstrated. The high quality epitaxial $VO_2$ thin film was achieved using an $SnO_2$ template layer in between the $VO_2$ layer and $TiO_2$ substrate, which enabled it to perform a resistance change of 4 orders of magnitude by electrical triggering. The $VO_2$ RF switches exhibited an $S_{21}$ difference greater than 30 dB at 24.3 GHz by electrical triggering, which implies that electrical IMT is comparable to other IMT approaches. The $VO_2$ RF switches also showed high frequency responses of insertion losses of −3 dB at the on-state and return losses of −4.3 dB at the off-state over 27 GHz. The study on electrical IMT dynamics revealed 840 ns of phase transition time. The epitaxial $VO_2$-based RF switches demonstrated high-frequency response and fast transition time.

Example 3

Figure 11A:
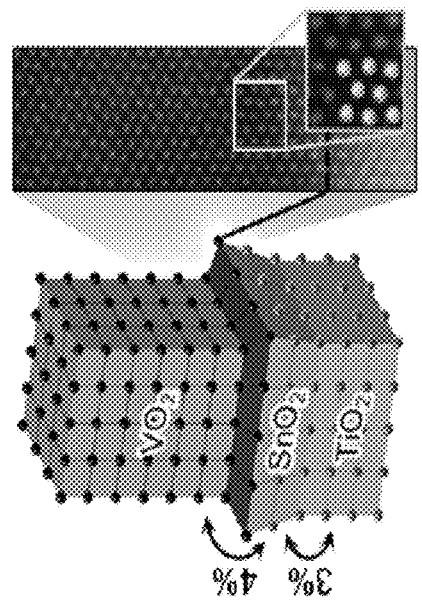
FIGS. 11A through 11H show the design of uniform bulk-like lattices in epitaxial $VO_2$ as follows.

This example reports new template engineering that utilizes an intermediate $SnO_2$ layer for growing epitaxial $VO_2$ films and controlling their IMT dynamics. $SnO_2$ is insulating and has a rutile structure, which makes it as an appropriate template for $VO_2$. Particularly, the $SnO_2$ template was adopted because of its large lattice mismatch (i.e., ~4.2%) with $VO_2$, contrary to conventional thin-film epitaxy that prefers a lattice-matched substrate or template. The huge lattice mismatch would lead to an incoherent interface with abrupt strain relaxation and uniform bulk-like lattices in epitaxial $VO_2$ films (FIG. 11B), relieving the lattice constraint imposed by the substrate. The structure without the $SnO_2$ layer is depicted in FIG. 11A. The theoretical simulation emphasizes that these conditions are essential for realizing the sharp and homogeneous IMT dynamics and also preventing crack formation. Thus, utilizing the poorly lattice-matched template might control the IMT dynamics, and could allow crack-free epitaxial $VO_2$ films with sharp IMT above room temperature.

Figure 11C:
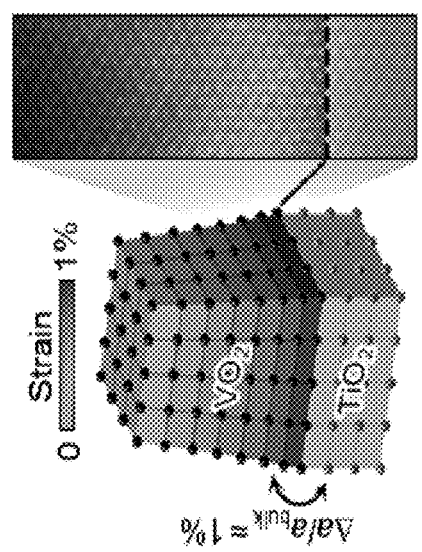
Figure 11B:
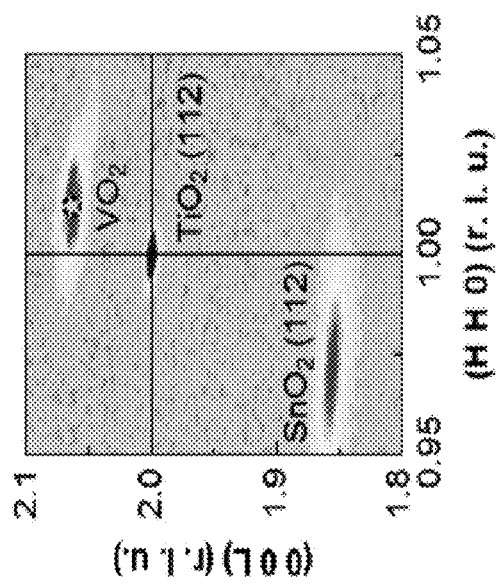
Figure 11D:
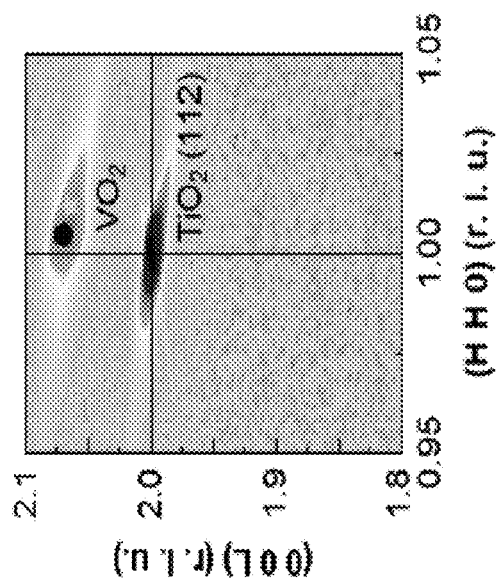
Figure 11E:
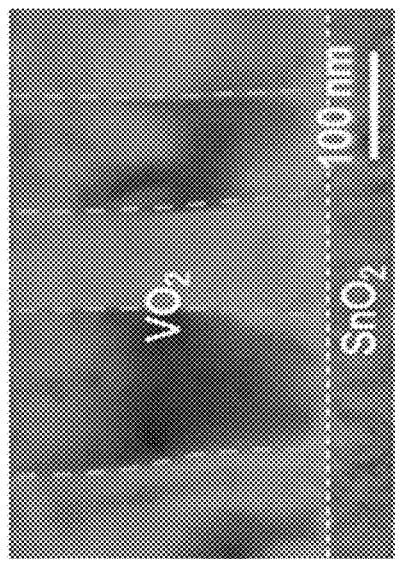
Figure 11G:
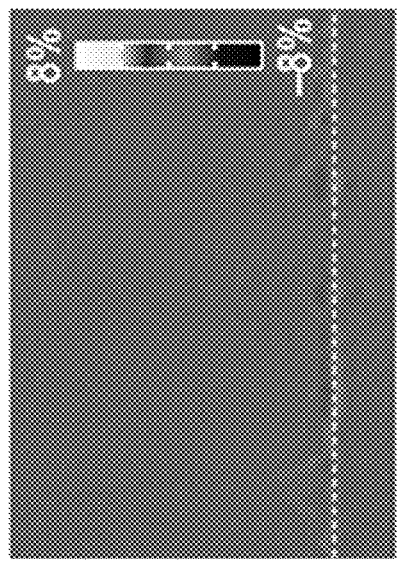

The lattice strain was examined in $VO_2$ films, using X-ray diffraction reciprocal space mappings (RSMs). FIGS. 11C and 11D show the RSMs around the $TiO_2$ (112) Bragg peak for $VO_2$ films on bare (001) $TiO_2$ and $SnO_2$-templated $TiO_2$, respectively. For the $VO_2/TiO_2$ film (FIG. 11C), the diffraction peak position of the film (closed circle) was far from that of $VO_2$ bulk (closed star), indicating that the $VO_2$ film is still strained substantially. Also, the diffraction peak of the film showed a streak pointing toward the bulk peak position, implying the gradual strain relaxation in the film. On the other hand, for the $VO_2/SnO_2/TiO_2$ film (FIG. 11D), the peak position of the film was identical to that of $VO_2$ bulk. This indicated that the use of $SnO_2$ template enabled the growth of unstrained epitaxial $VO_2$ films via abrupt strain relaxation.

Figure 11F:
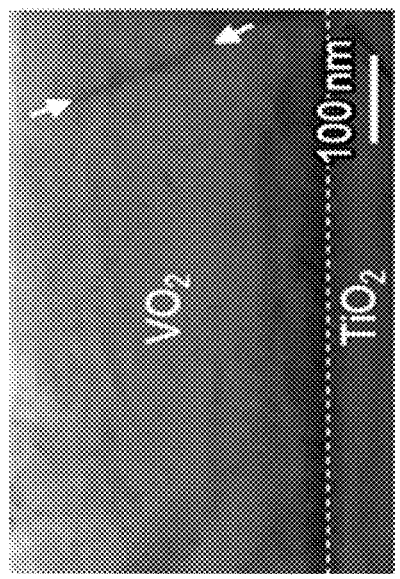
Figure 11H:
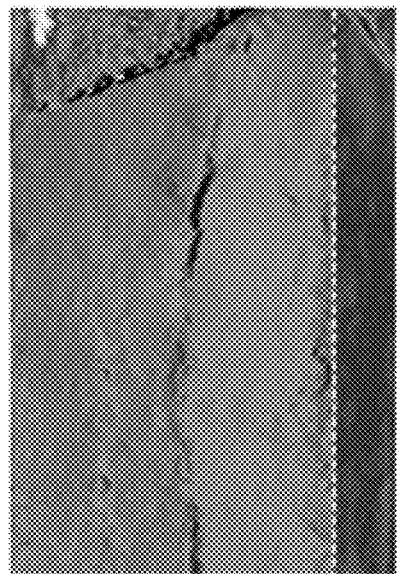

To obtain further information, a high-resolution, real-space strain mapping was conducted using dark-field inline electron holography (FIGS. 11E, 11F, 11G, and 11H). According to the measured strain map of the $VO_2/TiO_2$ film (FIGS. 11E and 11G), the out-of-plane strain was around −1.8% near the bottom interface due to the misfit strain. The strain became relaxed and negligible near the top surface or cracks (denoted by white arrows in FIG. 11E), which generates a strain gradient in both the out-of-plane and in-plane directions. On the other hand, the $VO_2/SnO_2/TiO_2$ film exhibited uniform bulk-like lattices without any crack and noticeable inhomogeneity (FIGS. 11F and 11H). Notably, domain/grain boundaries (denoted by a dashed lines in FIG. 11F) didn't induce any considerable lattice inhomogeneity. Based on theoretical prediction (FIGS. 10B and 10C), these uniform bulk-like lattices would lead to sharp and homogeneous IMT dynamics above room temperature in the SnO$_2$-templated VO$_2$ film. FIG. 10A is a calculated strain-temperature phase diagram of a (001) VO$_2$ film.

Figures 12A, 12B:
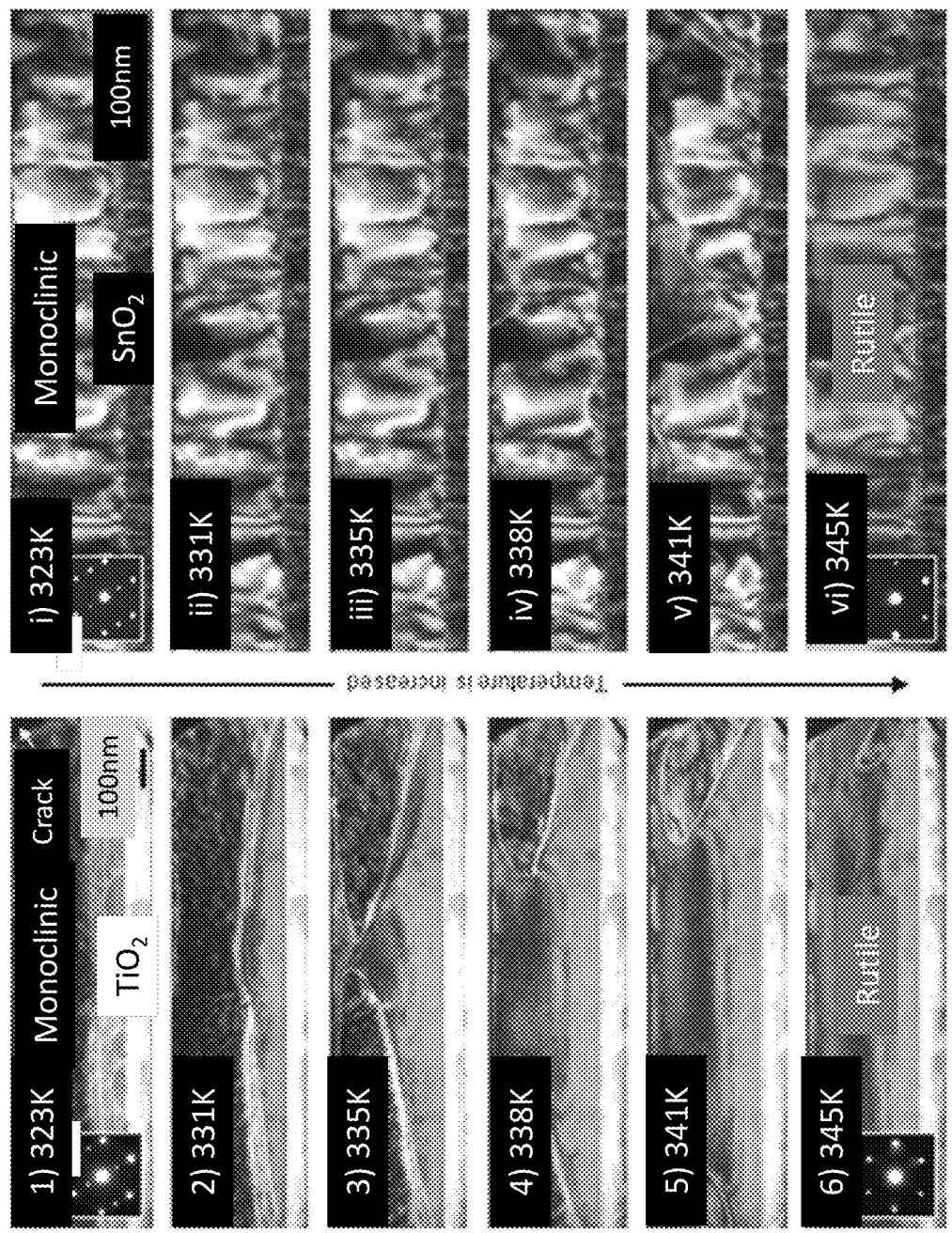
FIG. 12A through FIG. 12D show visualization and control of phase transition dynamics in epitaxial $VO_2$ as follows.

In-situ transmission electron microscopy (TEM) was used to visualize the phase transition dynamics in epitaxial VO$_2$ films in real time. FIG. 12A shows the monoclinic-to-rutile SPT dynamics of the VO$_2$/TiO$_2$ film, according to which the rutile phase started to nucleate preferentially from the bottom interface (i.e., the highly strained region) at ~315 K, much lower than the bulk $T_{IMT}$ (i.e., ~341 K). Then, the nucleated phase propagated toward the top surface and cracks. Both on heating and cooling, the phase evolution nearly followed the measured profile of the local strain (FIG. 11G), consistent with theoretical simulations (FIG. 10C). This revealed that the local lattice strain determines the phase transition dynamics at the nanoscale, and can explain why the phase transition of epitaxial VO$_2$ films usually proceeds over a wide range of $T_{IMT}$.

Differently from the VO$_2$/TiO$_2$ film, however, the VO$_2$/SnO$_2$/TiO$_2$ film showed a much sharper and homogeneous phase transition. FIG. 12B shows that the rutile phase started to nucleate both from the top surface and bottom interface at ≥338 K, and then propagated forward, consistent with theoretical simulations (FIG. 10C). SPT was mostly completed in a narrow temperature range between ~341 and ~343 K. Quantitative analyses (FIG. 12C) more clearly showed that the phase transition occurred in a much narrower temperature range in VO$_2$/SnO$_2$/TiO$_2$ film than that in VO$_2$/TiO$_2$ film. This highlights that the use of the proper template can allow a sharp phase transition, as well as control the phase transition dynamics in epitaxial VO$_2$ films.

Interestingly, the in-situ nanoscale imaging (FIG. 12B) revealed that the propagating phase boundaries were not perturbed by complex microstructures (i.e., domain/grain boundaries) in the film, but persisted with the collective and continuous evolution across different domains/grains. In conventional materials, such structural imperfections largely affect and sometimes even inhibit phase transitions. In epitaxial VO$_2$ films, however, domain/grain boundaries did not affect the propagation of phase boundaries much. This might originate from a relatively large interfacial energy of the phase boundaries. The monoclinic-to-rutile SPT in VO$_2$ is accompanied with an abrupt change (as large as ≥0.8%) in lattice parameters, causing a large elastic energy at phase boundaries. Also, due to the coexisting SPT and IMT, phase boundaries in VO$_2$ have an electronic dissimilarity between insulating and metallic phases, which could further increase the phase boundary energy. Thus, as long as the domain/grain boundaries have a smaller interfacial energy than the phase boundaries, they could have a minor effect during phase transition in VO$_2$ [as predicted in (B) of FIGS. 10B and 10C] and might not compromise the sharpness of phase transition.

Figure 12D:
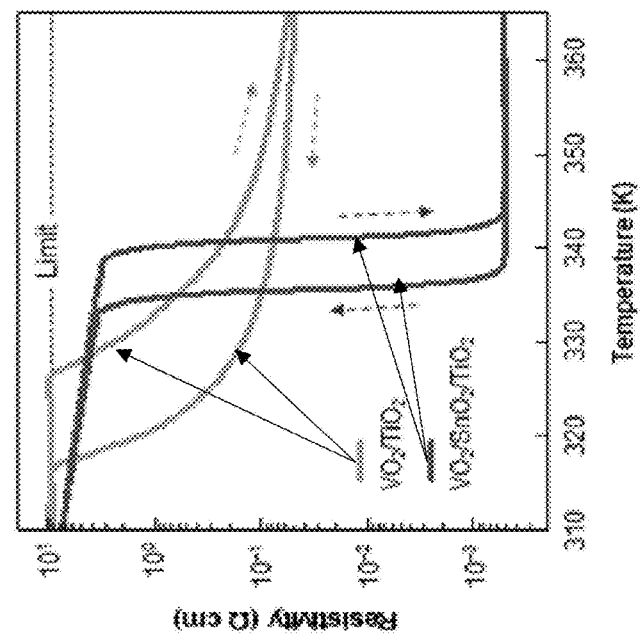
Figure 12C:
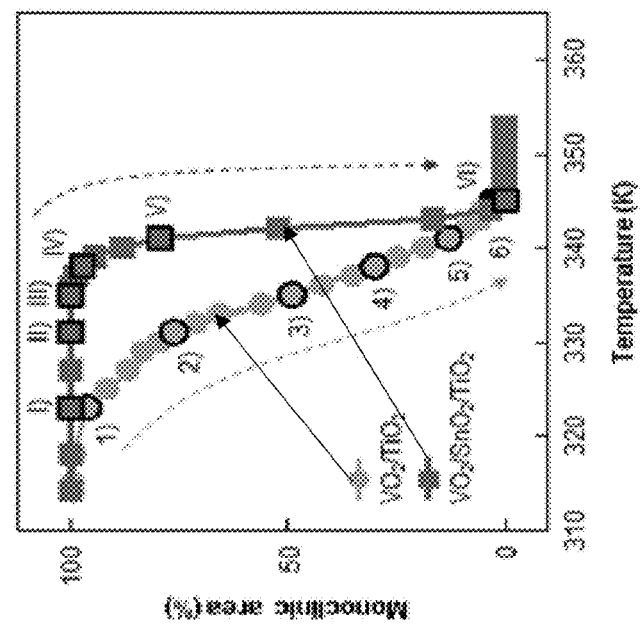

Given the observed sharp and homogeneous SPT, a sharp IMT in the VO$_2$/SnO$_2$/TiO$_2$ film was expected. The IMT was characterized in epitaxial VO$_2$ films by measuring electrical resistivity as a function of temperature (FIG. 12D). The measured IMT showed resistivity change by a factor of ~10$^4$ in VO$_2$/SnO$_2$/TiO$_2$ film, whereas it became quite suppressed in VO$_2$/TiO$_2$ film due to the presence of cracks. Also, the VO$_2$/SnO$_2$/TiO$_2$ film showed quite sharp IMT, with a transition width ΔT (measured as FWHM of the logarithmic derivative of the resistivity with temperature) that was as small as ~0.8 K. In the metallic phase, the VO$_2$/SnO$_2$/TiO$_2$ film showed not only the small resistivity, but also a clear metallic characteristic (i.e., decrease in resistivity with decreasing temperature), owing to the absence of severe structural/chemical defects in the film. These results confirmed excellent IMT features in SnO$_2$-templated epitaxial VO$_2$ films.

The VO$_2$/SnO$_2$/TiO$_2$ film was shown to undergo sharp and homogenous IMT with varying temperature. Another way for triggering the IMT is to apply external electric field. Applying an electric field to VO$_2$ drives carrier injection and then induces the formation of a local metallic path in VO$_2$ on a short time scale of <1 ns. However, after the metallic path forms locally, the electric field falls and a thermal process by Joule heating follows with the relation, $\Delta T \propto 1-\exp(-t/\tau)$, where τ is a time constant. When the electric field is removed, the reverse metal-to-insulator transition is also governed by a cooling process with $\Delta T \propto \exp(-t/\tau)$. These indicate that the switching speed in VO$_2$ could generally be limited to thermal processes (e.g., thermal transition width ΔT of IMT). Thus, the sharp IMT (i.e., narrow transition width ΔT) in VO$_2$/SnO$_2$/TiO$_2$ film would naturally allow a fast switching by electric field (i.e., small switching time Δt).

Figure 13D:
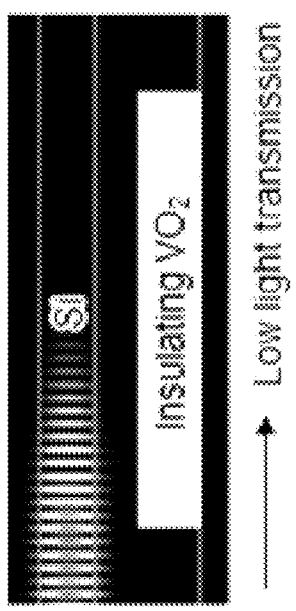
Figure 13C:
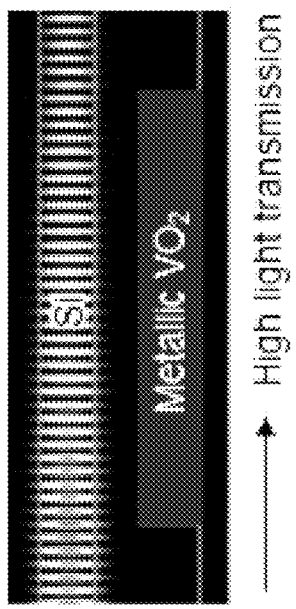

To evaluate the switching speed and device applications, an electrically switchable optical waveguide, i.e., optical modulator, was designed, composed of Si single crystal and epitaxial VO$_2$ film (FIG. 13A). During IMT, the optical constants of VO$_2$ (i.e., refractive index n and extinction coefficient k) become largely changed. Utilizing this, the light confinement and transmission can be electrically controlled through an Si waveguide. When VO$_2$ is insulating (i.e., $n_{VO2}$=3.1), light cannot be well propagating through Si waveguide with $n_{Si}$=3.4, due to imperfect total reflection and light absorption in VO$_2$ with $k_{VO2}$=0.3 (FIGS. 13A and 13C). On the other hand, when VO$_2$ is electrically switched to the metallic state (i.e., $n_{VO2}$=1.7), the mode becomes tightly confined inside the Si waveguide such that the transmission loss substantially decreases (FIGS. 13B and 13D). Importantly, while electrical transport measurements can be governed just by local metallic paths in VO$_2$, this optical transmission is determined by the overall fraction of metallized VO$_2$, and thus can give effective way to estimate the genuine switching speed of VO$_2$ by electric field.

Figures 13E, 13F:
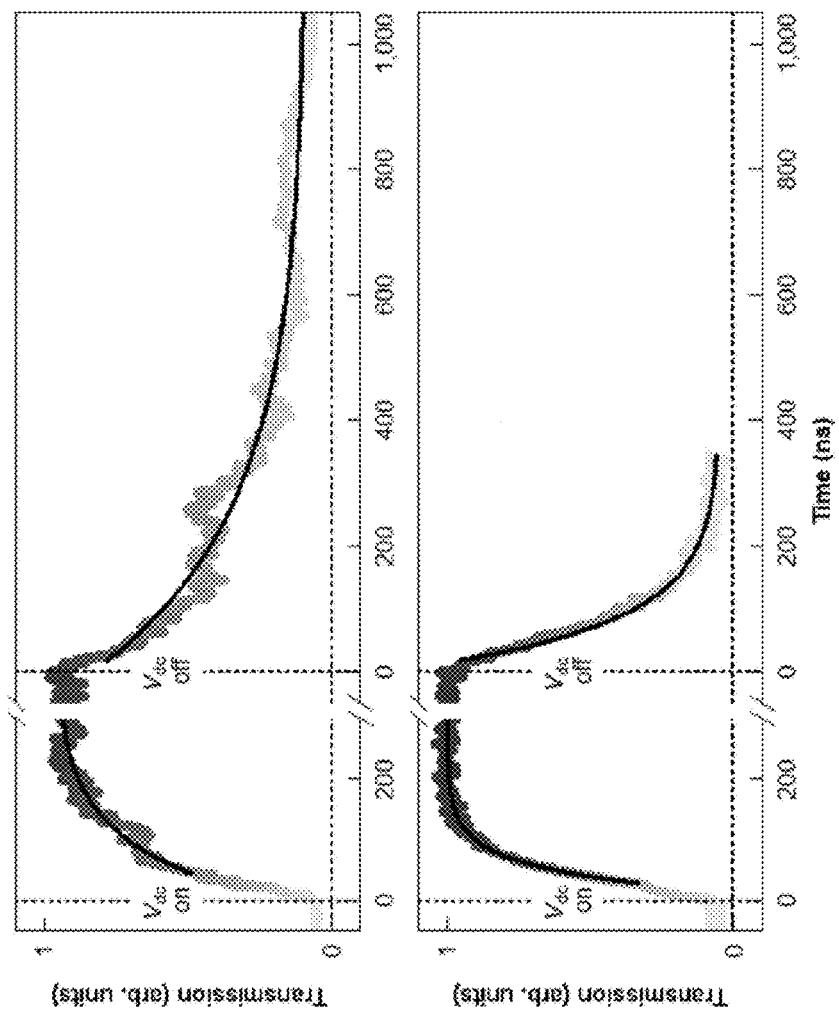

FIGS. 13E and 13F show the time-dependent optical transmission upon the application and removal of electric field for VO$_2$/TiO$_2$- and VO$_2$/SnO$_2$/TiO$_2$-based optical modulators. The light transmission became 10~100-times enhanced upon the application of the electric field, quantitatively consistent with the device simulations. Regarding the switching speed, the VO$_2$/SnO$_2$/TiO$_2$-based device exhibited the full transition of light transmission on time scales of ~150 ns and ~300 ns during the on and off switchings, respectively (FIG. 13F), which were 3~4 times shorter than those of VO$_2$/TiO$_2$-based device (FIG. 13E). Through fitting, the time constant r was estimated to be ~36 ns and ~74 ns during the on and off switching, respectively, for a VO$_2$/SnO$_2$/TiO$_2$-based device, whereas they were ~91 ns and ~252 ns during the on and off switching, respectively, for a VO$_2$/TiO$_2$-based device. The switching speed became much enhanced possibly due to the sharp IMT of the SnO$_2$-templated films, but it could be further improved later by optimizing the device design.

Template engineering for epitaxial VO$_2$ films has been demonstrated as a route for controlling the IMT dynamics and achieving sharp and large IMT above room temperature. This example provides the nanoscale visualization of phase transition dynamics in epitaxial VO$_2$, which reveals not only the critical role of local lattice strain, but also the minor effect of domain/grain boundaries on the IMT dynamics, contrary to conventional belief.

Thin Film Growth.

The epitaxial $VO_2$ thin films were grown on a (001) $TiO_2$ substrate using the pulsed laser deposition (PLD) method. Before deposition, low miscut (<0.1°) $TiO_2$ substrates were cleaned by sonicating with acetone and then rinsing with isopropanol. A $SnO_2$ epitaxial layer with a thickness of 100 nm was deposited as a bottom template on the $TiO_2$ substrate. A KrF excimer laser ($\lambda$=248 nm) beam was focused on $SnO_2$ and $V_2O_5$ ceramic targets to an energy density of ~2.0 J cm$^{-2}$ and pulsed at 5 Hz (for the $SnO_2$ layer) or 10 Hz (for the $VO_2$ layer). The $SnO_2$ layer was grown at a substrate temperature of 400° C. and oxygen partial pressure of 50 mTorr. After the growth of the $SnO_2$ layer, the $VO_2$ layer was grown at a temperature of 400° C. and an oxygen partial pressure of 18 mTorr. After growth, the $VO_2$ films were cooled down to room temperature at an oxygen partial pressure of 18 mTorr.

XRD Measurements.

The structural quality of the films was examined using a high-resolution four-circle X-ray diffraction (XRD) machine (Bruker D8 advance). XRD patterns of the out-of-plane XRD $\theta$–$2\theta$ scan of 300-nm-thick $VO_2$ films on (001) $TiO_2$ and $SnO_2$/$TiO_2$ substrates showed a clear film peak at $2\theta$=64.8° along with the (002) diffraction peaks from the underlying rutile $SnO_2$ and $TiO_2$ substrate. The film diffraction peak comes from the ($\overline{4}02$) diffraction of monoclinic $VO_2$, corresponding to the (002) diffraction of high-temperature rutile $VO_2$ phase. No other peaks were observed by XRD analysis, which showed that that the $VO_2$ film was highly oriented and had a pure phase. Importantly, the peak position was almost identical to that (i.e., $2\theta$~64.7°) of the ($\overline{4}02$) diffraction for bulk monoclinic $VO_2$, suggesting that the film was fully relaxed with bulk-like lattices. Also, the film diffraction peak showed a symmetrical shape, implying that the misfit strain was abruptly relaxed, as opposed to gradual strain relaxation.

TEM Sample Preparation and In-Situ TEM.

Samples for cross-sectional TEM were prepared by mechanical grinding to a thickness of 80 μm, dimpling to a thickness of less than 10 μm. The mechanically polished samples were ion-milled using 3 kV Ar$^+$ ion beam (PIPS, Gatan), and then a low energy (0.7 kV) Ar$^+$ ion beam was used to remove the surface-damaged layer. In-situ heating experiments were performed in a field-emission TEM (JEM-2100F, Jeol) operated at 200 kV. The samples were heated up to 363 K with a heating rate of 5 K min$^{-1}$ using a Gatan double tilt heating holder (Model 652-Ta) and then allowed to cool down to room temperature. Real time movies were acquired during the heating-cooling cycle in dark-field TEM mode to distinguish the monoclinic/rutile phase domains, using a CCD camera (ORIUS 200D, Gatan) at 25 frames s$^{-1}$.

Inline Electron Holography.

Local strain maps were obtained using inline electron holography. The inline electron holography experiment was performed using a JEOL 2100F, equipped with a 200 kV field emission gun. All images were recorded using a Gatan's GIF Tridiem imaging filter to remove inelastically scattered electrons outside an energy window of 0±7.5 eV. An objective aperture of 10 μm in diameter was placed on the microscope's optical axis for selecting a specific beam. The size of this aperture limited the spatial resolution to 0.8 nm. For the out-of-plane strain mapping, the incident electron beam was tilted in such a way that the excited (002) reflection was aligned parallel to the optical axis of the microscope, where the subscript s denotes the substrate (i.e., $TiO_2$). The (200) reflection was chosen for mapping the in-plane component of the strain, and the transmitted beam was used for mapping the electrostatic potential. Bright-field (BF) and dark-field (DF) images at defocus values ranging from −8 μm to +8 μm were acquired exposing a 2048×2048 pixels fiber-optically coupled UltraScan 1000 FT (Gatan, Inc.) camera for 4 s and 8 s, respectively. In order to avoid the post-growth fluctuation or segregation of indium as a result of intense electron beam irradiation during the TEM imaging, the TEM images were obtained at a low magnification under low electron dose conditions. The 2-D electron phase information was reconstructed from a focal series of BF/DF TEM images using the full resolution wave reconstruction (FRWR) software.

Crack Formation.

The contribution of the $SnO_2$ template to protect the $VO_2$ films against cracking was explored. $VO_2$ bulk crystals and epitaxial films tend to crack during phase transition and degrade upon repeated cycling. During SPT on cooling, the rutile phase becomes monoclinically distorted with the formation of monoclinic domains. The domain formation simultaneously causes strong internal stress near domain boundaries, whose value may locally exceed a critical strength and causes cracking, especially in the case of large-sized single crystals. Therefore, it was expected that such crack formation could be avoided in epitaxial $VO_2$ films that are composed of small grains in their as-grown state.

Cracks were found to be increasingly formed upon repeated thermal cycles and severely affected the IMT features in $VO_2$ films on bare $TiO_2$. The increase of resistance by cracks was more significant for the nominally metallic phase and, as a result, the magnitude of resistance change across the IMT was greatly reduced, down to ~10$^5$%. On the other hand, the $VO_2$ films on $SnO_2$/$TiO_2$ showed quite robust IMT, whose magnitude of resistance change remained well conserved as ~10$^6$% even after 1,000 cycles.

Phase Diagram Calculation.

According to the Landau theory, the phase transition in $VO_2$ can be described by structural order parameters $\eta$, with $\eta$=0 and $\eta\neq0$ representing the rutile and monoclinic phases, respectively. The total free energy density is given by $$f = \frac{1}{2}A_2\eta^2 + \frac{1}{4}A_4\eta^4 + \frac{1}{6}A_6\eta^6 + \frac{1}{2}c_{ijkl}(\varepsilon_{ij} - \varepsilon_{ij}^0)(\varepsilon_{kl} - \varepsilon_{kl}^0), \quad (S1)$$

where $A_2$, $A_4$, and $A_6$ are coefficients of the Landau polynomial under stress-free boundary conditions, $c_{ijkl}$ is the elastic stiffness tensor, and $\varepsilon_{ij}$ and $\varepsilon_{ij}^0$ are the total strain and eigen strain, respectively. The eigen strain is related to the structural order parameter through $\varepsilon_{ij}^0 = \varepsilon_{ij}^{00}\eta^2$, where $\varepsilon_{ij}^{00}$ is the stress-free transformation strain from the rutile to monoclinic phase transition. Among all the coefficients, only $A_2$ is assumed to be dependent on temperature, i.e., $A_2 = A_0[T - T_c]$, where $A_0$ is a constant and $T_c$ is the Curie temperature. In the calculation, $A_0 = 1.42 \times 10^6$ N m$^{-2}$, $T_c$=325 K, $A_4$=−7.12× 10$^6$ N m$^{-2}$, $A_6$=−5.34×10$^7$ N m$^{-2}$, Young's modulus E=155 GPa, Poisson's ratio v=0.287, and $\varepsilon_{ij}^{00}$ takes the value from Gu Y., Cao J., Wu J. & Chen L.-Q. (See, Thermodynamics of strained vanadium dioxide single crystals. *J. Appl. Phys.* 108, 083517 (2010).)

The strain-temperature phase diagram was obtained by applying the thin film boundary conditions, i.e., $$\varepsilon_{11} = \varepsilon_{22} = \varepsilon_s, \varepsilon_{12} = 0, \frac{\partial f}{\partial \varepsilon_{13}} = 0, \frac{\partial f}{\partial \varepsilon_{23}} = 0, \frac{\partial f}{\partial \varepsilon_{33}} = 0, \quad (S2)$$

where $\varepsilon_s$ is the biaxial epitaxial strain. Equation (S2) indicates that $\varepsilon_s$ is fixed by the substrate, with the out-of-plane direction stress-free. Through minimizing the free energy density in Eq. (S1) under the thin-film boundary conditions, the stable phases can be calculated at different temperatures and epitaxial strains.

Phase-Field Simulations.

The domain structure was evolved by solving the time-dependent phase-field equations $$\frac{\delta \eta}{\delta t} = L \frac{\delta F}{\delta \eta}, \quad (S3)$$

where t is time, L is the kinetic coefficient related to the domain wall mobility and F is the total free energy, which is expressed by $$F = \int \left[ f + \frac{1}{2} g \left( \left( \frac{\partial \eta}{\partial x_1} \right)^2 + \left( \frac{\partial \eta}{\partial x_2} \right)^2 + \left( \frac{\partial \eta}{\partial x_3} \right)^2 \right) \right] dV, \quad (S4)$$

where g is the gradient energy coefficient, $x_i$ is the spatial coordinate, and V is the system volume.

In the $x_1$ and $x_2$ directions, periodic boundary conditions were assumed, whereas a superposition method was used along the $x_3$ direction. For the constrained film, it was assumed that the top surface was stress-free, while the bottom interface was coherently clamped by the substrate. For the membrane, it was assumed that both the top surface and bottom interface were stress free. Equation (S3) was solved based on a semi-implicit Fourier-spectral method. The system size was 128Δx×128Δx×52Δx and the grid spacing was Δx=0.42 nm. Two types of strain conditions were applied to the $VO_2$ films in the phase-field simulations.
(1) Uniform Strain $$\varepsilon_{11}(x,y,z) = \varepsilon_{22}(x,y,z) = -0.0056 \quad (S5)$$

(2) Strain Gradient in Both the Out-of-Plane and in-Plane Direction $$\varepsilon_{11}(x, y, z) = \begin{cases} -0.0056, & z \geq \frac{39x + 780}{63}, \text{ or } z \geq \frac{-39x + 5811}{63} \\ -0.0056 + \frac{0.0146}{2457}(39x - 63z + 780), & x \leq 64, \text{ and } z < \frac{39x + 780}{63} \\ -0.0056 - \frac{0.0146}{2457}(39x + 63z - 5811), & x > 64, \text{ and } z < \frac{-39x + 5811}{63} \end{cases} \quad (S6)$$

$$\varepsilon_{22}(x, y, z) = \varepsilon_{11}(x, y, z)$$

It was assumed that the interfacial energy between monoclinic and rutile phases was $\gamma_{RM}$, and the interfacial energy between two monoclinic domains is $\gamma_{MM}$. $\gamma_{RM}$ was not only structural interfacial energy, but also metal-insulator interfacial energy[7,8], whereas $\gamma_{MM}$ refers to pure ferroelastic domain wall energy with the magnitude $\gamma_{MM} \sim 10$ mJ m$^{-2}$. As a result, $\gamma_{RM}$ could be much larger than $\gamma_{MM}$ (i.e., interfacial energy ratio $$\alpha = \frac{\gamma_{MM}}{\gamma_{RM}} \to 0),$$

making the effect of monoclinic domain boundaries negligible. To describe different monoclinic domains in the phase-field simulations, the phase-transition transformation strain $\varepsilon_{ij}^{00}$ was assumed to be position dependent, and the spatial distribution was fixed during the evolution of Equation S3. Note that $\varepsilon_{ij}^{00}$ in different positions was related by the rotation symmetry. The simulation setting was used to reflect the small interfacial energy ratio α. The simulated domain evolution reflected experimental observations. It was experimentally confirmed that the phase transition dynamics was not much affected by the domain/grain.

Stress Distribution Calculation.

The stress distribution from the phase-field simulation was plotted and it was determined that the monoclinic domain walls have a large effect on the stress distribution. For single monoclinic domain, the stress was concentrated near the monoclinic-rutile phase boundaries. For multiple monoclinic domains, however, the stress was concentrated at both the monoclinic-rutile phase boundaries and domain wall-interface intersections.

The mechanical boundary conditions were found to have a significant effect on the stress distribution. When both of the interfaces were subject to stress free boundary conditions, the local stress was largely reduced. For the coherently grown films, this could be well modeled by boundary conditions of the stress-free top surface and the constrained bottom interface (constrained bottom interface means that the displacement from the film to the substrate is continuous). For the incoherently grown films, the boundary conditions could be complex, and should be between the two limiting cases of the constrained film and the membranes. The simulation results showed that the mechanical boundary conditions of the incoherent interface played an important role in relieving the stress and preventing the formation of cracks during SPT.

Electrical and Optical Measurements.

Using the standard four-contact van der Pauw method with contacts of Al, the electrical resistivity was measured in vacuum as a function of temperature in $VO_2$ films with or without $SnO_2$ template. As a reference, the electrical transport was also measured for the fully coherent 8-nm-thick $VO_2$ film on $TiO_2$ substrate. It was quantitatively estimated that the sharpness of IMT for the $SnO_2$-templated film was <1 K, by using the full-width-at-half-maximum (FWHM) of the derivative curves. This sharpness is comparable with that of fully coherent 8-nm-thick $VO_2$ films on bare $TiO_2$, which is expected to show the sharpest MIT among $VO_2$ films.

Using spectroscopic ellipsometry, the refractive index n and extinction coefficient k were measured as a function of temperature. For the $VO_2$ film on bare $TiO_2$ substrate, the n exhibited gradual change across IMT. On the other hand, for the $VO_2$ film on $SnO_2$-templated $TiO_2$, the n showed abrupt change for every A across IMT.

Fabrication and Characterizations of Optical Modulators.

The Si—$VO_2$ optical modulator was constructed on a $VO_2$ layer 1410 with a thin transfer-printed single crystalline silicon layer 1410 (also referred to as a Si "nanomembrane" (NM)) (FIG. 14). The $VO_2$ layer 1410 was grown epitaxially on an $SnO_2$ template layer 1406, which was itself grown on a TiO$_2$ substrate 1402 (panel (e)), as previously described. Then, the VO$_2$ layer 1410 was patterned into a narrower strip (or "switching layer") by photolithography and reactive ion etching (RIE) in the CF$_4$ gas (panel (f)). Separately, Si NM 1420 was prepared, starting with a silicon-on-insulator substrate (SOI, Soitec) with a 205-nm-thick single-crystalline Si NM 1420 overlying a 400-nm-thick buried oxide (BOX) SiO$_2$ layer 1422 atop a silicon handle substrate 1424 (panel (a)). To achieve the desired Si thickness of 190 nm, the Si NM 1420 was thinned down using thermal oxidation followed by wet etching of the oxidation layer in HF. Etching holes 1421 were patterned into Si NM 1420 by photolithography and reactive ion etching to expose buried oxide layer 1422 (panel (b)) and an SF$_6$/O$_2$ etch was used to release Si NM 1420 from the SOI structure (panel (c)). Released Si NM 1420 was transferred onto patterned VO$_2$ layer 1410 using an elastomeric polydimethylsiloxane (PDMS) stamp 1416 via a transfer-printing method (panels (d) and (h)). (See, Meitl, M. A. et al. Transfer printing by kinetic control of adhesion to an elastomeric stamp. *Nature Mater.* 5, 33-38 (2006); and Zhang, K., Seo, J.-H., Zhou, W. & Ma, Z. Fast flexible electronics using transferrable silicon nanomembranes. *J. Phys. D: Appl. Phys.* 45, 143001 (2012).) Prior to the transfer, a planarization/adhesive layer 1414 (SU-8 2000.5, Microchem) was spin-coated on VO$_2$ layer 1410 (panel (g)). Since planarization/adhesive layer 1414 also served as an optical cladding layer, the thickness was adjusted to ~150 nm to maximize optical switching performance. After finishing the transfer printing, a mask 1418 was formed over Si NM 1420 (panel (i)) and then the Si waveguide 1430 was defined in the single-crystalline silicon by e-beam lithography and inductively coupled plasma etching in Cl$_2$ (panel (j)). Exposed planarization/adhesive layer 1414 was also etched using RIE in O$_2$ (panel (j)). Finally, metal electrodes 1430, 1432 of 10-nm-thick Ti and 300-nm-thick Au were formed through additional e-beam lithography, e-beam evaporation, and lift-off (panel (j)). To measure optical switching performance, a tunable laser (Tunics Plus) and an optical oscilloscope (Agilent 86116A) were used. The laser was coupled into the Si waveguide with single mode lensed fibers. A wide wavelength range of the input signal (1.5 µm to 1.6 µm with 0.25-µm step) was used to demonstrate the wide bandwidth of the optical switch. The output optical signal from the Si waveguide was also coupled to single-mode lensed fiber and sent to the oscilloscope. During the measurement, a 15-V peak to peak (in the range of 0 V to 15 V) square wave in 1-MHz frequency was applied to the Au electrode using a function generator (Tektronix FG5010). A 1 kΩ resistor was connected in series to the optical switch to suppress the current level and to avoid burning the device.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A switch for electromagnetic radiation comprising:
    an electromagnetic radiation waveguide;
    a layer of VO$_2$ in electrical or optical communication with the electromagnetic radiation waveguide, wherein the layer of VO$_2$ comprises a plurality of connected crystalline VO$_2$ domains having the same crystal structure and epitaxial orientation; and
    an external stimulus source configured to apply an insulator to metal phase transition-inducing external stimulus to the layer VO$_2$.

2. The switch of claim 1 further comprising a layer of columnar, crystalline domains of rutile SnO$_2$ underlying the layer of VO$_2$, wherein the VO$_2$ domains have an epitaxial relationship with the columnar, crystalline domains of rutile SnO$_2$.

3. The switch of claim 1, wherein the VO$_2$ is characterized in that it undergoes an insulator to metal phase transition at a temperature in the range from 58° C. to 68° C.

4. The switch of claim 3, wherein the VO$_2$ is characterized in that the insulator to metal phase transition has a sharpness, as measured by the full width at half maximum of the derivative curve of its heating curve, of no greater than 5° C.

5. The switch of claim 4, wherein the VO$_2$ is characterized in that, when it undergoes the insulator to metal phase transition, its electrical resistance decreases by at least four orders of magnitude.

6. The switch of claim 1, wherein the layer of VO$_2$ has a thickness in the range from 100 to 500 nm.

7. The switch of claim 1, wherein the external stimulus source is a heat source configured to heat the VO$_2$ from a first temperature below its insulator to metal phase transition temperature to a second temperature above its insulator to metal phase transition temperature.

8. The switch of claim 1, wherein the external stimulus source is an external voltage source configured to apply an external voltage to the layer of VO$_2$.

9. The switch of claim 1, wherein the electromagnetic radiation waveguide is a radiofrequency waveguide.

10. The switch of claim 9 further comprising a ground line in electrical communication with the layer of VO$_2$.

11. The switch of claim 10, wherein the radiofrequency waveguide is a discontinuous waveguide comprising a first portion and a second portion, and further wherein the first portion is connected to the second portion through the layer of VO$_2$.

12. The switch of claim 1, wherein the electromagnetic radiation waveguide is an optical waveguide and the layer of VO$_2$ is in optical communication with the optical waveguide.

13. The switch of claim 12, wherein the optical waveguide comprising a layer of single-crystalline silicon.

14. A method of switching a radiofrequency signal using the switch of claim 10, the method comprising:
    transmitting a radiofrequency signal along the radiofrequency waveguide when the VO$_2$ is in an insulating state; and
    applying an external stimulus from the external stimulus source to the VO$_2$, wherein the external stimulus induces the VO$_2$ to undergo an insulator to metal phase transition, thereby attenuating the transmission of the radiofrequency signal along the radiofrequency waveguide.

15. A method of switching a radiofrequency signal using the switch of claim 11, the method comprising:
- transmitting a radiofrequency signal along the first portion of the radiofrequency waveguide when the $VO_2$ is in an insulating state; and
- applying an external stimulus from the external stimulus source to the $VO_2$, wherein the external stimulus induces the $VO_2$ to undergo an insulator to metal phase transition, thereby increasing the transmission of the radiofrequency signal transmitted from the first portion of the radiofrequency waveguide to the second portion of the radiofrequency waveguide.

16. A method of switching an optical signal using the switch of claim 12, the method comprising:
- transmitting an optical signal along the optical waveguide when the $VO_2$ is in its insulating state; and
- applying an external stimulus from the external stimulus source to the $VO_2$, wherein the external stimulus induces the $VO_2$ to undergo an insulator to metal phase transition, thereby increasing the transmission of the optical signal along the optical waveguide.

* * * * *

UNITED STATES PATENT AND TRADEMARK OFFICE
CERTIFICATE OF CORRECTION

PATENT NO. : 10,216,013 B2
APPLICATION NO. : 15/451745
DATED : February 26, 2019
INVENTOR(S) : Zhenqiang Ma et al.

It is certified that error appears in the above-identified patent and that said Letters Patent is hereby corrected as shown below:

In the Specification

Column 3, Line 59:
Delete the phrase "$\varepsilon_{by}$," and replace with --$\varepsilon_{yy}$,--.

Column 18, Line 52:
Delete the phrase "the time constant r" and replace with --the time constant $\tau$--.

Column 22, Line 61:
Delete the phrase "for every A across" and replace with --for every $\lambda$ across--.

Signed and Sealed this
Seventh Day of May, 2019

Andrei Iancu
*Director of the United States Patent and Trademark Office*